United States Patent
Oya et al.

(10) Patent No.: US 6,916,860 B2
(45) Date of Patent: Jul. 12, 2005

(54) ANTIFOULING COATING COMPOSITION, COATING FILM THEREFROM, BASE MATERIAL COVERED WITH THE COATING FILM AND ANTIFOULING METHOD

(75) Inventors: Masaaki Oya, Ohtake (JP); Naoya Nakamura, Ohtake (JP); Makoto Tsuboi, Ohtake (JP)

(73) Assignee: Chugoku Marine Paints, Ltd., Hiroshima (JP)

(*) Notice: Subject to any disclaimer, the term of this patent is extended or adjusted under 35 U.S.C. 154(b) by 36 days.

(21) Appl. No.: 10/375,005

(22) Filed: Feb. 28, 2003

(65) Prior Publication Data

US 2003/0207962 A1 Nov. 6, 2003

(30) Foreign Application Priority Data

Mar. 6, 2002 (JP) ........................... 2002-060696

(51) Int. Cl.$^7$ ............................................... C08K 5/09
(52) U.S. Cl. ................. 523/122; 106/18.36; 106/15.05; 524/588; 524/272; 524/322; 524/300
(58) Field of Search ................................ 524/300, 588, 524/272, 322; 106/15.05, 18, 36; 523/122

(56) References Cited

U.S. PATENT DOCUMENTS

| | | | |
|---|---|---|---|
| 4,593,055 A | 6/1986 | Gitlitz et al. | |
| 6,458,878 B1 * | 10/2002 | Tsuboi et al. | 524/432 |
| 6,828,030 B2 * | 12/2004 | Arimura et al. | 428/447 |

FOREIGN PATENT DOCUMENTS

| | | |
|---|---|---|
| EP | 0 775 733 | 5/1997 |
| EP | 0 802 243 | 10/1997 |
| EP | 1 016 681 | 7/2000 |
| EP | 1 201 700 | 5/2002 |
| EP | 1 288 234 | 3/2003 |
| JP | 60-500452 | 4/1985 |
| JP | 63-057675 | 3/1988 |
| JP | 63-215780 | 9/1988 |
| JP | 63 215780 | 9/1988 |
| JP | 02-196869 | 8/1990 |
| JP | 2775862 | 2/1991 |
| JP | 03-031372 | 2/1991 |
| JP | 04-264168 | 9/1992 |
| JP | 04-264169 | 9/1992 |
| JP | 04-264170 | 9/1992 |
| JP | 5-32433 | 5/1993 |
| JP | 06-157940 | 6/1994 |
| JP | 06-157941 | 6/1994 |
| JP | 06-340511 | 12/1994 |
| JP | 07-018216 | 1/1995 |
| JP | 07-102193 | 4/1995 |
| JP | 08-199095 | 8/1996 |
| JP | 08-269388 | 10/1996 |
| JP | 08-269389 | 10/1996 |
| JP | 08-269390 | 10/1996 |
| JP | 08-277372 | 10/1996 |
| JP | 09-048947 | 2/1997 |
| JP | 09-048948 | 2/1997 |
| JP | 09-048949 | 2/1997 |
| JP | 09-048950 | 2/1997 |
| JP | 09-048951 | 2/1997 |
| JP | 10-030071 | 2/1998 |
| JP | 10 279840 | 10/1998 |
| JP | 10 279841 | 10/1998 |
| JP | 11-335619 | 12/1999 |
| JP | 11-343451 | 12/1999 |
| JP | 2000-063737 | 2/2000 |
| JP | 2000-248029 * | 9/2000 |
| JP | 2001 106962 | 4/2001 |
| JP | 2002-097406 | 4/2002 |
| WO | WO 84/02915 | 8/1984 |
| WO | WO 91/14743 | 3/1991 |
| WO | WO 91/14743 | 10/1991 |
| WO | WO 99/33927 | 7/1999 |
| WO | WO 00/77102 | 12/2000 |

OTHER PUBLICATIONS

Machine generated translation of JP 2000–248029.*

* cited by examiner

Primary Examiner—Margaret G. Moore
(74) Attorney, Agent, or Firm—Sherman & Shalloway

(57) ABSTRACT

An antifouling coating composition comprising (A) a silyl ester copolymer containing constituent units derived from a polymerizable unsaturated carboxylic acid silyl ester; (B) a carboxylic acid; (C) a bivalent or trivalent metal compound; and (D) a dehydrating agent. It is preferred that the component (C) be contained in an amount of 1.2 equivalents or more, in terms of the number of equivalents of metal as a constituent of the component (C), per equivalent of carboxyl group of the carboxylic acid (B); that the component (C) be a bivalent metal compound; and that the component (C) be a compound of at least one metal selected from the group consisting of zinc, copper, magnesium, calcium and barium. From the antifouling coating composition, there can be obtained an antifouling coating film which exhibits less cracking tendency, excellent adherence so as to ensure less peeling tendency and desirably controlled hydrolysis rate so as to be excellent in antifouling performance, in particular, antifouling properties in highly fouling environment and long-term antifouling properties. With respect to the provided antifouling coating composition, its storage stability is high, its concentration can be increased, the amount of solvent used therefor can be reduced, and its applicability is high.

22 Claims, No Drawings

ANTIFOULING COATING COMPOSITION, COATING FILM THEREFROM, BASE MATERIAL COVERED WITH THE COATING FILM AND ANTIFOULING METHOD

FIELD OF THE INVENTION

The present invention relates to an antifouling coating composition which contains a silyl ester copolymer, an antifouling coating film formed from the antifouling coating composition, an antifouling method wherein the antifouling coating composition is used, and a marine vessel (hull) or underwater structure covered with the coating film.

More particularly, the present invention relates to an antifouling coating composition which can be formed into an antifouling paint whose storage stability is excellent and wherein the amount of solvent used can be reduced due to low viscosity. From the antifouling paint, there can be obtained an antifouling coating film which exhibits less cracking tendency, excellent adherence so as to ensure less peeling tendency and desirably controlled hydrolysis rate so as to be excellent in antifouling performance (antifouling activity), in particular, antifouling properties in stationary environment or highly fouling environment and long-term antifouling properties. Further, the present invention relates to an antifouling coating film formed from the antifouling coating composition, an antifouling method wherein the antifouling coating composition is used, and a hull or underwater structure covered with the coating film.

BACKGROUND OF THE INVENTION

Ship bottoms, underwater structures, fishing nets and the like are likely to have their appearance and function damaged by the adhesion to surface and propagation of various aquatic organisms including animals such as shellfishes, hard-shelled mussels and barnacles, plants such as laver (seaweeds) and bacteria which is caused when they are exposed to water for a prolonged period of time.

In particular, when such an aquatic organism adheres to a ship's bottom and propagates, it may occur that the surface roughness of the ship as a whole is increased to thereby lower the speed of the ship and increase the fuel consumed by the ship. Removing the aquatic organism from the ship bottom necessitates spending of extensive labor and working time. Also, when bacteria adhere to, for example, an underwater structure and propagate and, further, slime (sludgy matter) adheres thereto to cause putrefaction, or when a large sticky organism adheres to the surface of an underwater structure, for example, steel structure and propagates to thereby damage the coating for corrosion prevention provided on the underwater structure, there is the danger that damages such as deterioration of the strength and function of the underwater structure and thus marked shortening of the life thereof are invited.

It is common practice to apply, for example, a composition comprising a copolymer of tributyltin methacrylate and methyl methacrylate or the like and cuprous oxide ($Cu_2O$) as an antifouling paint having excellent antifouling properties to ship bottoms, etc. so as to avoid the above damages. This copolymer of the antifouling paint is hydrolyzed in the seawater to thereby liberate organotin compounds such as bistributyltin oxide (tributyltin ether of the formula $Bu_3Sn$—O—$SnBu_3$ wherein Bu is a butyl group) and tributyltin halides ($Bu_3SnX$ wherein X is a halogen atom), so that an antifouling effect is exerted. Furthermore, the copolymer hydrolyzate per se is a "hydrolyzable self-polishing paint" which is rendered water-soluble and thus is dissolved in the seawater, so that no resin residue is left on the surface of the ship bottom coating with the result that always an active surface can be maintained.

However, the above organotin compounds are so highly toxic that apprehensions are being entertained with respect to marine pollution, occurrence of anomalous fish and anomalous shellfish and adverse effects on ecosystem through food chain. Therefore, the development of a non-stannic antifouling paint is desired as a substitute therefor.

For example, antifouling paints based on silyl esters as described in Japanese Patent Laid-open Publication Nos. 4(1992)-264170 (reference (a)), 4(1992)-264169 (reference (b)) and 4(1992)-264168 (reference (c)) can be mentioned as the above nonstannic antifouling paint. However, these antifouling paints have such problems that not only are their antifouling capabilities poor but also cracking and peeling are likely to occur as pointed out in Japanese Patent Laid-open Publication Nos. 6(1994)-157941 (reference (d)) and 6(1994)-157940 (reference (e)).

Further, Japanese Patent Laid-open Publication No. 2(1990)-196869 (reference (f)) teaches, for example, an antifouling paint comprising a blocked acid-functionality copolymer (A) which is obtained by copolymerizing trimethylsilyl methacrylate, ethyl methacrylate and methoxyethyl acrylate in the presence of an azo polymerization initiator and which contains a triorganosilyl carboxylate ester group, namely, a carboxylic acid group blocked with a trimethylsilyl group; a polycationic compound (B) which is an organic-solvent-soluble salt of polyvalent metal; and a biocide. In the use of this antifouling paint, for example, the trimethylsilyl group blocking the carboxylic acid group is split off by water contained in the paint, and the polyvalent cation reacts with thus formed carboxylic acid group of the acid-functionality copolymer (A), thereby effecting a crosslinking and hardening. However, in this reference, there is no description with respect to a method of coping with water produced by, for example, adding a carboxylic acid and zinc white (zinc oxide) to the paint. Further, the antifouling paint poses such a problem that when a free acid remains in the antifouling paint, the antifouling paint loaded with a component which reacts with a free acid to thereby produce water, there occur, for example, gelation and thickening causing deterioration of storage stability, deterioration of performance, etc. Still further, there is such a problem that when the acid-functionality copolymer (A) is hydrolyzed and when a crosslinking reaction occurs between thus formed acid group and the polycation, the elution (leaching) of the acid-functionality copolymer (A) would be suppressed to result in deterioration of the abradability of coating film and deterioration of long-term antifouling capability.

Thus, the antifouling paint described in the above reference has poor storage stability, and the coating film obtained from the antifouling paint has a drawback in that the cracking resistance thereof is not fully satisfactory.

Published Japanese Translation of PCT Patent Applications from Other States, No. 60(1985)-500452 (reference (g)) and Japanese Patent Laid-open Publication No. 63(1988)-215780 describe a resin for antifouling paint which is obtained by copolymerizing a vinyl monomer having an organosilyl group, such as a trialkylsilyl ester of (meth)acrylic acid, with another vinyl monomer and which has a number average molecular weight of 3000 to 40,000. It is further described that the resin can be blended with an organic water coupler such as trimethyl orthoformate, an antifouling agent such as cuprous oxide and a pigment such as red iron oxide. However, as described in the above Japanese Patent Laid-open Publication No. 6(1994)-157940 (reference (e)), this resin for antifouling paint has drawbacks in that it is likely to gel during the storage thereof and that the coating film formed from the antifouling paint is poor in cracking and peeling resistances.

Japanese Patent Publication No. 5(1993)-32433 corresponding to the above Published Japanese Translation of PCT Patent Applications from Other States, No. 60(1985)-500452 (reference (g)) discloses an antifouling paint comprising a poison (a) and a polymer binder (b) having a repeating unit of the formula —$CH_2$—CX(COOR)—(B)— (wherein X is H or $CH_3$, R is $SiR'_3$ or $Si(OR')_3$ in which R' is an alkyl group, etc. and B is an ethylenically unsaturated monomer residue), which polymer binder has a specified hydrolysis rate. Further, it is described that the antifouling paint can contain a solvent, a water-sensitive pigment component, an inert pigment, a filler and a retarder. However, the coating film obtained from the antifouling paint described in this reference has a drawback in that its cracking resistance is poor.

Japanese Patent Laid-open Publication No. 3(1991)-31372 (having matured to Japanese Patent No. 2775862, reference (h)) discloses a coating composition for preventing the attachment of organisms, comprising a polymer of monomer A and/or a copolymer AB from the monomer A and a vinyl polymerizable monomer B which is copolymerizable with the monomer A, an antifouling agent and a surfactant. The monomer A is represented by the formula $CH_2$=C(X)—C—(=O)—OR (I) (wherein X is H or —$CH_3$, and R is an organic group represented by the formula:

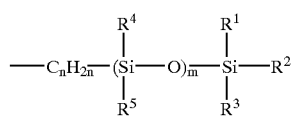

(a)

wherein n is 0 or 1; m is a real number of 0 or greater; each of $R^1$ to $R^3$ represents a group such as an alkyl, an alkoxyl or phenyl; and each of $R^4$ and $R^5$ represents the same group as represented by $R^1$ to $R^3$ or a group selected from organosiloxane groups of the formula:

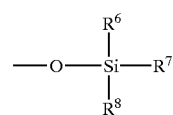

(b)

wherein each of $R^6$ to $R^8$ represents the same group as represented by $R^1$ to $R^3$ or a group of the formula (b), provided that m groups represented by $R^4$ and $R^5$ may be identical with or different from each other). As the surfactant, there are mentioned, for example, a fatty acid of −5° C. or higher melting point having 8 or more carbon atoms and an ester thereof. It is described that because the polymer A and copolymer AB contained in the coating composition are hydrolyzed in the presence of water, it is desirable to, before forming the coating composition into a paint, add thereto a water coupler for trapping water contained in the antifouling agent and the pigment. As the water coupler, there are mentioned triethyl orthoformate, tetraethyl silicate (($C_2H_5O$—$)_4$Si), etc. (In the corresponding Japanese Patent No. 2775862, the water coupler is described as an essential component.)

In this coating composition, the source of water is not limited to the antifouling agent and pigment mentioned above, and water is also produced by a reaction between a fatty acid and a pigment, e.g., zinc oxide (ZnO). Thus, in the coating composition described in this reference, water may be produced during the preparation thereof (during the formation into paint). However, a hydrolyzable ester compound or ether compound as the water coupler, after hydrolysis, forms an alcohol. When the polymer has a silyl ester structure, not only is there the possibility of formation of a polycarboxylic acid through transesterification but also dehydration condensation with a silanol produced as a by-product by hydrolysis occurs to thereby form an alkoxysilyl compound, so that the possibility of new water formation is high. Therefore, there is such a problem that the storage stability of the coating composition is poor, and that the coating film obtained therefrom is poor in long-term antifouling properties.

Japanese Patent Laid-open Publication No. 6(1994)-340511 (reference (i)) discloses a marine organism antifouling agent containing a metal salt of organic acid whose solubility in water falls within a specified range. As the organic acid, there is mentioned a saturated aliphatic monocarboxylic acid having 7 to 10 carbon atoms. As the metal for constituting the metal salt of organic acid, there are mentioned metals belonging to Groups Ib, IIa, IIb, IIIa, IIIb, IVa, IVb, Va, Vb, VIa, VIb, VIIa and VIII of the periodic table, such as Cu, Zn and Ni.

Further, it is described that in the use of the marine organism antifouling agent, the antifouling agent can be dissolved in a vehicle, such as an oil based varnish or a chlorinated rubber based resin varnish, before the use.

However, in this reference, there is no description teaching or suggesting a mode wherein a silyl ester copolymer containing constituent units derived from a polymerizable unsaturated carboxylic acid silyl ester is employed as a coating film forming component. Actually, even if only this metal salt (marine organism antifouling agent) is added to a silyl ester copolymer, the obtained antifouling coating composition poses a problem of poor storage stability.

Japanese Patent Laid-open Publication No. 7(1995)-18216 (reference (j)) discloses a coating composition comprising as principal components a polymer (A) from an organosilicon-containing monomer A having in its molecule a triorganosilicon ester group represented by the formula —COO—$SiR^1R^2R^3$ (I) (wherein each of $R^1$, $R^2$ and $R^3$ is, for example, an alkyl group having 1 to 18 carbon atoms) and copper or a copper compound (B), which coating composition contains as an essential component other than the components (A) and (B) a silicon compound having an alkoxy group represented by the formula:

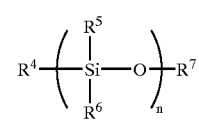

(C)

(wherein each of $R^4$ to $R^6$ represents, for example, a hydrogen atom, or an alkoxy group or cycloalkoxy group having 1 to 18 carbon atoms; $R^7$ represents, for example, an alkyl group having 1 to 18 carbon atoms; and n is an integer of 1 to 3). In this reference, it is described that a copolymer AB from the above monomer A having the group represented by the formula (I) and a vinyl monomer copolymerizable therewith B may be contained in the coating composition. As the monomer B, there are mentioned (meth)acrylic esters such as methyl (meth)acrylate, ethyl (meth)acrylate and dimethylaminoethyl (meth)acrylate. As the above copper or copper compound (B), there are mentioned copper powder, copper naphthenate, etc. As the above silicon compound having an alkoxy group (C), there are mentioned tetraethoxysilane, tetra-n-butoxysilane and the like. Furthermore, it is described that a pigment such as zinc oxide, a resin such as rosin, etc. may be contained in the coating composition.

However, this silicon compound having an alkoxy group (C), when water is present in the paint, induces a hydrolytic reaction with the water to thereby become an alcohol. Thus, an adverse influence on an increase of water in the paint and coating film is apprehended. Moreover, the silanol after the hydrolysis poses such a problem that silanol molecules undergo a condensation reaction to thereby reproduce water.

In this reference, there is no particular description teaching or suggesting an antifouling coating composition wherein a silyl ester copolymer, a carboxylic acid, a bivalent or trivalent metal compound and a dehydrating agent are employed in combination. The coating film obtained from the coating composition as particularly described in this reference has a drawback in that it is inferior in cracking resistance and antifouling properties, especially, antifouling properties in stationary environment or highly fouling environment.

Japanese Patent Laid-open Publication No. 7(1995)-102193 (reference (k)) discloses a coating composition comprising as essential components an antifouling agent and a copolymer obtained from a monomer mixture containing monomer A represented by the formula X—SiR$^1$R$^2$R$^3$ (wherein R$^1$, R$^2$ and R$^3$ all represent a group selected from among alkyl and aryl groups and may be identical with or different from each other, and X represents an acryloyloxy, a methacryloyloxy, a maleinoyloxy or a fumaroyloxy group), and monomer B represented by the formula Y—(CH$_2$CH$_2$O)n-R$^4$ (wherein R$^4$ represents an alkyl or an aryl group, Y represents an acryloyloxy or a methacryloyloxy group, and n is an integer of 1 to 25). As the antifouling agent, there are mentioned in organic compounds such as cuprous oxide, copper powder and other copper compounds, zinc sulfate and zinc oxide, and further mentioned organometallic compounds such as oxine copper and other organocopper compounds, organonickel compounds, and zinc pyrithione and other organozinc compounds. However, the paint described in this reference has a drawback in that it is inferior in antifouling properties, especially, antifouling properties in stationary environment or highly fouling environment.

Japanese Patent Laid-open Publication No. 8(1996)-199095 (reference (l)) discloses a coating composition comprising as essential components an antifouling agent and a copolymer obtained from a monomer mixture containing the above monomer A represented by the formula X—SiR$^1$R$^2$R$^3$ (1) described in Japanese Patent Laid-open Publication No. 7(1995)-102193 and monomer B represented by the formula Y—(CH(R$^4$))—(OR$^5$) (2) (wherein R$^4$ represents an alkyl group; R$^5$ represents an alkyl or a cycloalkyl group; and Y represents an acryloyloxy, a methacryloyloxy, a maleinoyloxy or a fumaroyloxy group), optionally together with a vinyl monomer C copolymerizable with the monomers A and B. As the vinyl monomer C, there are mentioned, for example, acrylic esters, methacrylic esters, styrene and vinyl acetate. Moreover, as the antifouling agent, there are mentioned inorganic compounds such as cuprous oxide, copper powder and other copper compounds, zinc sulfate and zinc oxide, and further mentioned organometallic compounds such as oxine copper and other organocopper compounds, organonickel compounds, and zinc pyrithione and other organozinc compounds.

Japanese Patent Laid-open Publication No. 8(1996)-269388 (reference (m)) discloses a coating composition comprising, as essential components, bis(2-pyridinethiol-1-oxide) copper salt (copper pyrithione) and a copolymer obtained from a monomer mixture containing monomer A represented by the formula X—SiR$^1$R$^2$R$^3$ (1) (wherein R$^1$, R$^2$ and R$^3$ all represent a hydrocarbon group having 1 to 20 carbon atoms and may be identical with or different from each other, and X represents an acryloyloxy, a methacryloyloxy, a maleinoyloxy, a fumaroyloxy or an it aconoyloxy group), and monomer B represented by the formula Y—(CH$_2$CH$_2$O)n-R$^4$ (2) (wherein R$^4$ represents an alkyl or an aryl group; Y represents an acryloyloxy, a methacryloyloxy, a maleinoyloxy, a fumaroyloxy or an it aconoyloxy group; and n is an integer of 1 to 25). For example, dimethyl-t-butylsilyl acrylate is mentioned as the monomer A. As the antifouling agent, there are mentioned inorganic compounds such as cuprous oxide, copper powder and other copper compounds, zinc sulfate and zinc oxide, and further mentioned organometallic compounds such as oxine copper and other organocopper compounds, organonickel compounds, and zinc pyrithione and other organozinc compounds. Furthermore, for example, rosin and rosin derivatives are mentioned as an elution rate regulator which can be added to the coating composition. However, with respect to the coating film from the paint described in this reference, the antifouling properties in stationary environment are not satisfactory, and there is room for further improvement to, for example, the storage stability of paint.

Japanese Patent Laid-open Publication No. 8(1996)-269389 (reference (n)) discloses a coating composition comprising an antifouling agent and a copolymer from a monomer mixture containing an unsaturated monomer A having a triorganosilyl group and a monomer B represented by any of the following formulae (2) to (9).

The monomer B can be:

monomer having a tertiary amino group, represented by the formula CH$_2$=CR$^4$COOR$^5$—NR$^6$R$^7$ (2) (wherein R$^4$ represents H or CH$_3$; R$^5$ represents an alkylene group; and R$^6$ and R$^7$ represent alkyl groups and maybe identical with or different from each other), monomer containing a quaternary ammonium salt, represented by the formula CH$_2$=CR$^8$COOR$^9$—NR$^{10}$R$^{11}$R$^{12}$(Y) (3) (wherein R$^8$ represents H or CH$_3$; R$^9$ represents an alkylene group; R$^{10}$ to R$^{12}$ represent alkyl groups and maybe identical with or different from each other; and Y represents a halogen atom), monomer containing a nitrogen-containing heterocycle, represented by the formula CH$_2$=CH—Z (4) (wherein Z represents a group comprising a nitrogen-containing heterocycle), monomer having in its molecule an alkoxy group or an aryloxyalkylene glycol group, represented by the formula CH$_2$=CR$^{13}$COO(R$^{14}$O)m(R$^{15}$O)n(R$^{16}$O)o-R$^{17}$ (5) (wherein R$^{13}$ represents H or CH$_3$; R$^{14}$ represents an ethylene group; R$^{15}$ represents an alkylene group having 3 carbon atoms; R$^{16}$ represents an alkylene group having 4 carbon atoms; R$^{17}$ represents an alkyl group or aryl group; and each of m, n and o is an integer of 0 or greater, provided that n and o are not simultaneously 0), (meth)acrylamide represented by the formula $CH_2=CR^{18}CONR^{19}R^{20}$ (6) (wherein $R^{18}$ represents H or $CH_3$; and $R^{19}$ and $R^{20}$ represent alkyl groups and may be identical with or different from each other), (meth)acrylamide having a nitrogen-containing cyclic hydrocarbon group, represented by the formula $CH_2=CR^{21}CON(\ )Q$ (7) (wherein $R^{21}$ represents H or $CH_3$; and $N(\ )Q$ is a nitrogen-containing group wherein, for example, O, N or S may be contained in Q), (meth)acrylic ester containing a furan ring, represented by the formula $CH_2=CR^{23}COOCH_2-T$ (8) (wherein $R^{23}$ represents H or $CH_3$; and T represents a furan ring or a tetrahydrofuran ring), or monomer of the formula $CH_2=CH-CN$ (9).

Further, as an optional component copolymerizable with the above monomers A and B, there are mentioned various copolymerizable monomers such as acrylic acid, ethyl acrylate, 2-hydroxyethyl (meth)acrylate and 2-hydroxypropyl (meth)acrylate.

In the Example portion of the reference, there are mentioned, for example, a copolymer from tri-n-butylsilyl acrylate (TBSA), diethylaminoethyl methacrylate (DEAEMA) and methyl methacrylate (MMA), and a copolymer from tri-n-butylsilyl acrylate (TBSA), N,N-dimethylacrylamide (DMAA) and methyl methacrylate (MMA).

Still further, as a component which can be added to the coating composition, there are mentioned the same antifouling agents as described in the above Japanese Patent Laid-open Publication No. 8(1996)-269388.

Japanese Patent Laid-open Publication No. 8(1996)-269390 (reference (o)) discloses a coating composition comprising:

a polymer from monomer A represented by the formula $X-SiR^1R^2R^3$ (1) (wherein $R^1$, $R^2$ and $R^3$ all represent groups selected from among alkyl and aryl groups and may be identical with or different from each other, and X represents an acryloyloxy, a methacryloyloxy, a maleinoyloxy, a fumaroyloxy or an itaconoyloxy group), a polymer from monomer B represented by the formula $Y-(CH_2CH_2O)n-R^4$ (2) (wherein $R^4$ represents an alkyl or an aryl group; Y represents an acryloyloxy, a methacryloyloxy, a maleinoyloxy, a fumaroyloxy or an itaconoyloxy group; and n is an integer of 1 to 25), and an antifouling agent. As the antifouling agent, there are mentioned the same antifouling agents as described in the above Japanese Patent Laid-open Publication No. 8(1996)-269388. Further, as a component which can be added to the coating composition, there are mentioned, for example, resins such as rosin and antisetting agents. However, with respect to the coating film from the coating composition described in this reference, there is room for further improvement to the antifouling properties in stationary environment, and there is room for improvement to the storage stability of paint.

Japanese Patent Laid-open Publication No. 8(1996)-277372 (reference (p)) discloses a coating composition comprising a triphenylboron pyridine complex and a copolymer from a monomer mixture containing the monomer A represented by the formula $X-SiR^1R^2R^3$ (1) described in the above Japanese Patent Laid-open Publication No. 8 (1996)-269388 (reference (m)) and the monomer B represented by the formula $Y-(CH_2CH_2O)n-R^4$ (2) described in the same reference, wherein the resin component and marine organism adhesion inhibitor consist only of a nonmetallic polymer and an on metallic organic inhibitor, respectively. Further, for example, rosin and rosin derivatives are mentioned as an elution rate regulator which can be added to the coating composition. However, with respect to the coating film from the coating composition described in this reference, the antifouling properties in stationary environment are not satisfactory, and there is room for improvement to the storage stability of paint.

Japanese Patent Laid-open Publication No. 10(1998)-30071 (reference (q)) discloses a coating composition comprising at least one rosin compound (A) consisting of rosin, a rosin derivative or a rosin metal salt; a polymer having an organosilyl ester group (B) consisting of a polymer from at least one monomer M represented by the formula $X-SiR^1R^2R^3$ (1) (wherein $R^1$ to $R^3$ all represent groups selected from among alkyl and aryl groups and may be identical with or different from each other, and X represents an acryloyloxy, a methacryloyloxy, a maleinoyloxy, a fumaroyloxy, an itaconoyloxy or a citraconoyloxy group), and/or a polymer from the above at least one monomer M and at least one other polymerizable monomer; and an antifouling agent (C). As the antifouling agent, there are mentioned a wide variety of organic and inorganic antifouling agents, such as zinc oxide and copper naphthenate, which are the same as described in the above Japanese Patent Laid-open Publication No. 8(1996)-269388. Further, as components which can be added to the coating composition, there are mentioned, for example, pigments, water couplers, chlorinated paraffin and antisetting agents.

However, with respect to the paints and coating films disclosed in these references (k) to (q), the paints exhibit unsatisfactory storage stability, and the coating films are unsatisfactory in a balance of cracking resistance, peeling resistance (adherence of coating film), antifouling performance, in particular, antifouling properties in stationary environment, long-term antifouling properties and self-polishing properties.

Further, for example, 2-hydroxyethyl acrylate and 2-hydroxypropyl acrylate are mentioned as a copolymerizable optional component in Japanese Patent Publication No. 5(1993)-82865 (reference (r)). Still further, silyl (meth) acrylate copolymers are described in Japanese Patent Laid-open Publication No. 9(1997)-48947 (reference (s)), Japanese Patent Laid-open Publication No. 9(1997)-48948 (reference (t)), Japanese Patent Laid-open Publication No. 9(1997)-48949 (reference (u)), Japanese Patent Laid-open Publication No. 9(1997)-48950 (reference (v)), Japanese Patent Laid-open Publication No. 9(1997)-48951 (reference (w)), Japanese Patent Publication No. 5(1993)-32433 (reference (x)), U.S. Pat. No. 4,593,055 (reference (y)), Japanese Patent Laid-open Publication No. 2(1990)-196869 (reference (z)) and WO 91/14743 (reference (za)) However, with respect to the antifouling paints from the copolymers described in these references (r) to (za), there is room for further improvement to the storage stability thereof, and to, regarding the coating films therefrom, the balance of cracking resistance, peeling resistance (adherence of coating film), antifouling performance, in particular, antifouling properties in stationary environment and highly fouling environment, long-term antifouling properties and self-polishing properties.

Japanese Patent Laid-open Publication No. 63(1988)-215780 (reference (zb)) describes copolymers formed using, for example, methyl methacrylate, n-butyl methacrylate and acrylamide as copolymerization components, and further describes antifouling paints containing the above copolymers and cuprous oxide. However, these antifouling paints have the same drawbacks as those of the antifouling paints of the above references.

Japanese Patent Laid-open Publication No. 11(1999)-335619 (reference (zc)) discloses an antifouling coating composition comprising a copolymer from a monomer having a triorganosilyl group, represented by the formula (1) given below, and another ethylenically unsaturated monomer which is copolymerizable with the above monomer; a carboxyl group-containing monobasic acid; and a metal-containing antifbuling agent.

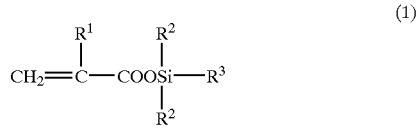

(1)

wherein $R^1$ represents H or $CH_3$; and each of $R^2$, $R^3$ and $R^4$ independently represents a group selected from the group consisting of an alkyl group having 1 to 18 carbon atoms, a cycloalkyl group and an aryl group.

Japanese Patent Laid-open Publication No. 11(1999)-343451 (reference (zd)) discloses an antifouling coating composition comprising a copolymer from a monomer having a triorganosilyl group, represented by the formula (2) given below, and another ethylenically unsaturated monomer which is copolymerizable with the above monomer; a carboxyl group-containing monobasic acid; and a metal-containing antifouling agent.

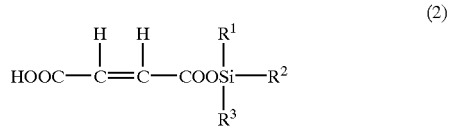

(2)

wherein each of $R^1$, $R^2$ and $R^3$ independently represents a group selected from the group consisting of an alkyl group having 1 to 18 carbon atoms, a cycloalkyl group and an aryl group.

Japanese Patent Laid-open Publication No. 2000-63737 (reference (ze)) discloses an antifouling coating composition comprising a copolymer from a monomer having a triorganosilyl group, represented by the above formula (1), and another ethylenically unsaturated monomer which is copolymerizable with the above monomer; a metallic soap of carboxyl group-containing monobasic acid; and a metal-containing antifouling agent.

However, with respect to the antifouling coating compositions described in these references (zc) to (ze), the storage stability thereof is not satisfactory, and lowering of the paint viscosity is so difficult that the use of much solvent has been inevitable. In particular, recently, there has been the problem that although it is demanded to reduce the amount of solvent added to a coating composition taking environmental pollution into account, it is difficult to prepare a paint of low solvent content from the antifouling coating compositions described in the references (zc) to (ze).

OBJECT OF THE INVENTION

The present invention has been made with a view toward solving the above problems of the prior art. It is an object of the present invention to provide an antifouling coating composition capable of forming an antifouling coating film which exhibits less cracking tendency, excellent adherence so as to ensure less peeling tendency and desirably controlled hydrolysis rate so as to be excellent in antifouling performance (antifouling activity), in particular, antifouling properties in highly fouling environment and long-term antifouling properties, which antifouling coating composition is excellent in storage stability, can have high concentration, can reduce the amount of solvent used therein and is excellent in applicability (uniform thick film can be formed by one coating operation).

It is another object of the present invention to provide an antifouling coating film formed from the above antifouling coating composition, an antifouling method wherein the antifouling coating composition is used, and a hull or underwater structure covered with the coating film.

SUMMARY OF THE INVENTION

The antifouling coating composition of the present invention comprises:

(A) a silyl ester copolymer containing constituent units derived from a polymerizable unsaturated carboxylic acid silyl ester, (B) a carboxylic acid, (C) a bivalent or trivalent metal compound (reactive with the carboxylic acid (B)), and (D) a dehydrating agent.

In the present invention, it is preferred that the bivalent or trivalent metal compound (C) be contained in an amount of 1.2 equivalents or more, in terms of the number of equivalents of metal as a constituent of the bivalent or trivalent metal compound (C), per equivalent of carboxyl group of the carboxylic acid (B).

In the present invention, it is also preferred that the bivalent or trivalent metal compound (C) be a bivalent metal compound, and that the bivalent or trivalent metal compound (C) be a compound of at least one metal selected from the group consisting of zinc, copper, magnesium, calcium and barium.

In the present invention, further, it is preferred that the carboxylic acid (B) be a resin acid or resin acid derivative containing at least one carboxylic acid selected from the group consisting of abietic acid, dehydroabietic acid, dihydroabietic acid, tetrahydroabietic acid, noragathic acid, agathenedicarboxylic acid, an agathenedicarboxylic acid monoalkyl ester, secodehydroabietic acid and isomers thereof.

Alternatively, it is preferred that the carboxylic acid (B) be at least one organic acid (excluding the resin acid) selected from the group consisting of isononanoic acid, versatic acid, naphthenic acid, oleic acid, linoleic acid, linolenic acid, tall oil fatty acid and soybean oil fatty acid.

In the present invention, preferably, the dehydrating agent (D) is an inorganic dehydrating agent. Further, it is preferred that the dehydrating agent (D) be contained in an amount of 0.15 to 50 equivalents per equivalent of carboxyl group of the carboxylic acid (B).

In the present invention, it is preferred that the constituent units (a) derived from a polymerizable unsaturated carboxylic acid silyl ester include constituent units derived from a silyl (meth)acrylate which are represented by the formula:

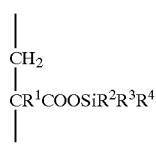

(I)

wherein $R^1$ represents hydrogen or a methyl group; and $R^2$, $R^3$ and $R^4$ may be identical with or different from each other, and each thereof represents any of a hydrogen atom, an alkyl group, a cycloalkyl group, a substituted or unsubstituted phenyl group and an alkylsilyloxy group.

In the present invention, it is preferred that in the formula (I), $R^2$ represent a branched alkyl group or a cycloalkyl group.

In the present invention, preferably, the silyl ester copolymer (A) contains constituent units (a) derived from a polymerizable unsaturated carboxylic acid silyl ester and constituent units (b) derived from a (meth)acrylate having a polar group.

The constituent units (b) derived from a (meth)acrylate having a polar group are preferably constituent units represented by the formula:

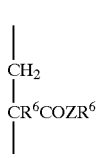

(II)

wherein $R^5$ represents a hydrogen atom or a methyl group; and Z represents an oxygen atom or a group of the formula —$NR^7$, provided that:

when Z is an oxygen atom, $R^6$ represents a substituted or unsubstituted hydroxyalkyl group, hydroxycycloalkyl group, polyalkylene glycol group of the formula —$(R^8O)nH$ (wherein $R^8$ represents an alkylene group, and n is an integer of 2 to 50) or alkoxypolyalkylene glycol group of the formula —$(R^xO)nR^y$ (wherein $R^x$ represents an alkylene group, $R^y$ represents an alkyl group, and n is an integer of 1 to 100), and when Z is a group of the formula —$NR^7$, $R^7$ represents an alkyl group unsubstituted or substituted with any of a halogen, a hydroxyl group, an amino group, a substituted amino group, an acyl group and an alkoxy group, and $R^6$ represents a hydrogen atom.

In the present invention, preferably, the silyl ester copolymer (A) is a copolymer containing:

silyl (meth)acrylate constituent units (a-1) represented by the formula:

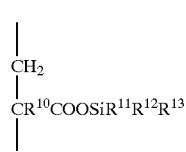

(I-a)

wherein $R^{10}$ represents a hydrogen atom or a methyl group; each of $R^{11}$ and $R^{12}$ independently represents a linear alkyl group having 1 to 10 carbon atoms, or a substituted or unsubstituted phenyl group or trimethylsilyloxy group; and $R^{13}$ represents a cyclic or acyclic, branched or unbranched alkyl group having 1 to 18 carbon atoms, or a substituted or unsubstituted phenyl group having 6 to 10 carbon atoms or trimethylsilyloxy group, and silyl (meth)acrylate constituent units (a-2) represented by the formula:

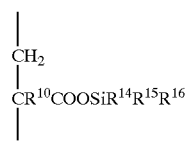

(I-b)

wherein $R^{10}$ represents a hydrogen atom or a methyl group; each of $R^{14}$ and $R^{15}$ independently represents a branched alkyl or cycloalkyl group having 3 to 10 carbon atoms; and $R^{16}$ represents a linear alkyl group having 1 to 10 carbon atoms, a branched alkyl or cycloalkyl group having 3 to 10 carbon atoms, or a substituted or unsubstituted phenyl group having 6 to 10 carbon atoms or trimethylsilyloxy group.

The antifouling coating composition of the present invention preferably further comprises an antifouling agent (E). Copper or a copper compound (E1) is preferably contained as the antifouling agent (E).

It is also preferred that an organic antifouling agent compound (E2) excluding an organocopper compound be contained as the antifouling agent (E).

Preferably, the antifouling coating composition of the present invention further comprises an excess amount of zinc oxide (E) as a coating film strength increasing agent, a coating film consumption regulator, a body pigment such as colorant, or a color pigment. The amount is up to 5000 equivalents, preferably 2 to 5000 equivalents, and still preferably 10 to 3000 equivalents per equivalent of carboxyl group of the carboxylic acid (B).

In the present invention, the antifouling coating composition may further comprise an elution accelerating component (G).

The antifouling coating film of the present invention is characterized in that it is formed from any of these antifouling coating compositions.

The marine vessel, underwater structure, fishing gear and fishing net according to the present invention are characterized in that they each have a surface covered with the antifouling coating film formed from any of these antifouling coating compositions.

The method of rendering antifouling a marine vessel, an underwater structure, a fishing gear or a fishing net according to the present invention comprises applying any of these antifouling coating compositions to a surface of base material of a marine vessel, an underwater structure, a fishing gear or a fishing net and drying the applied antifouling coating composition so that a formed antifouling coating film covers the base material surface.

The present invention provides an antifouling coating composition which ensures an excellent storage stability of paint, and from which there can be obtained an antifouling coating film that exhibits less cracking tendency, excellent adherence so as to ensure less peeling tendency and desirably controlled hydrolysis rate so as to be excellent in antifouling performance (antifouling activity), in particular, antifouling properties in stationary environment or highly fouling environment and long-term antifouling properties, the antifouling coating film further being excellent in a balance of these characteristics.

DETAILED DESCRIPTION OF THE INVENTION

The antifouling coating composition of the present invention will be described in detail below.

The antifouling coating composition of the present invention comprises (A) a silyl ester copolymer containing constituent units derived from a polymerizable unsaturated carboxylic acid silyl ester; (B) a carboxylic acid; (C) a bivalent or trivalent metal compound; and (D) a dehydrating agent.

(Silyl Ester Copolymer (A))

First, the silyl ester copolymer (A) will be described. The silyl ester copolymer for use in the present invention contains constituent units derived from a polymerizable unsaturated carboxylic acid silyl ester.

(a) Constituent Units Derived from a Polymerizable Unsaturated Carboxylic Acid Silyl Ester As the polymerizable unsaturated carboxylic acid silyl ester, there can be mentioned, for example, a silyl ester of unsaturated monocarboxylic acid such as acrylic acid or methacrylic acid; a silyl ester of α,β-unsaturated dicarboxylic acid such as itaconic acid, maleicacid, fumaric acid or citraconic acid (dicarboxylic acid); or a silyl ester of half ester of α,β-unsaturated dicarboxylic acid.

The above constituent units derived from a polymerizable unsaturated carboxylic acid silyl ester are preferably silyl (meth)acrylate constituent units of the formula:

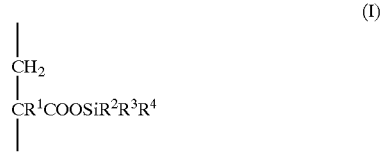

(I)

wherein $R^1$ represents a hydrogen atom or a methyl group; and $R^2$, $R^3$ and $R^4$ may be identical with or different from each other, and each thereof represents any of a hydrogen atom, an alkyl group, a cycloalkyl group, a substituted or unsubstituted phenyl group and an alkylsilyloxy group. This alkyl group preferably has 1 to 18 carbon atoms, still preferably 1 to 6 carbon atoms. This cycloalkyl group preferably has 3 to 10 carbon atoms, still preferably 3 to 8 carbon atoms. As the substituent which can replace a hydrogen atom of the phenyl group, there can be mentioned, for example, an alkyl, an aryl or a halogen.

The silyl (meth)acrylate from which the above silyl (meth)acrylate constituent units can be derived can be represented by the formula:

(I-a)

wherein $R^1$ is as defined in the above formula (I) and represents a hydrogen atom or a methyl group; and $R^2$, $R^3$ and $R^4$ are as defined in the above formula (I) and may be identical with or different from each other, and each thereof represents any of a hydrogen atom, an alkyl group, a cycloalkyl group, a substituted or unsubstituted phenyl group and an alkylsilyloxy group.

Specifically, for example, the above silyl (meth)acrylate (I-a) can be a silyl (meth)acrylate of the above formula wherein $R^2$, $R^3$ and $R^4$ are identical with each other, such as trimethylsilyl (meth)acrylate, triethylsilyl (meth)acrylate, tripropylsilyl (meth)acrylate, triisopropylsilyl (meth) acrylate, tributylsilyl (meth)acrylate, tri-sec-butylsilyl (meth)acrylate or triisobutylsilyl (meth)acrylate; or a silyl (meth)acrylate of the above formula wherein $R^2$, $R^3$ and $R^4$ are partially or wholly different from each other, such as di-sec-butyl-methylsilyl (meth)acrylate, sec-butyl-dimethylsilyl (meth)acrylate, dimethylpropylsilyl (meth)acrylate, monomethyldipropylsilyl (meth)acrylate or methylethylpropylsilyl (meth)acrylate.

These silyl (meth)acrylates can be used in combination.

With respect to these silyl (meth)acrylates, it is preferred that each of $R^2$, $R^3$ and $R^4$ independently represent an alkyl group having 1 to about 18 carbon atoms, such as methyl, ethyl, n-propyl, isopropyl, sec-butyl, tert-butyl or isobutyl. Still preferably, $R^2$ represents a branched alkyl group or a cycloalkyl group. Each of $R^3$ and $R^4$ may be identical with or different from $R^2$. Further, it is preferred that the sum of carbon atoms had by $R^2$, $R^3$ and $R^4$ range from 5 to about 21. Among these silyl (meth)acrylates, triisopropylsilyl (meth)acrylate, triisobutylsilyl (meth)acrylate, di-sec-butylmethylsilyl (meth)acrylate, sec-butyl-dimethylsilyl (meth) acrylate and tri-sec-butylsilyl (meth)acrylate are especially preferred from the viewpoint of easiness in the synthesis of silyl (meth)acrylate copolymer and from the viewpoint of the film forming properties, storage stability and easiness in abradability control of the antifouling coating composition wherein the silyl (meth)acrylate copolymer is employed.

(b) Constituent Units (b) Derived from a (meth)acrylate Having a Polar Group

In the present invention, preferably, the silyl ester copolymer contains constituent units (b) derived from a (meth) acrylate having a polar group together with the above constituent units (a) derived from a polymerizable unsaturated carboxylic acid silyl ester.

The constituent units (b) derived from a (meth)acrylate having a polar group, although not particularly limited as long as they are those derived from a (meth)acrylate monomer having a polar group, are preferably constituent units represented by the formula:

(II)

wherein $R^5$ represents a hydrogen atom or a methyl group; and Z represents an oxygen atom or a group of the formula —$NR^7$, provided that:

when Z is an oxygen atom, $R^6$ represents a substituted or unsubstituted hydroxyalkyl group, hydroxycycloalkyl group, polyalkylene glycol group of the formula —$(R^8O)nH$ (wherein $R^8$ represents an alkylene group, and n is an integer of 2 to 50) or alkoxypolyalkylene glycol group of the formula —$(R^xO)nR^y$ (wherein $R^x$ represents an alkylene group, $R^y$ represents an alkyl group, and n is an integer of 1 to 100), and when Z is a group of the formula —$NR^7$, $R^7$ represents an alkyl group unsubstituted or substituted with any of a halogen, a hydroxyl group, an amino group, a substituted amino group, an acyl group and an alkoxy group, and $R^6$ represents a hydrogen atom.

In the above formula (II), the hydroxyalkyl group preferably has 1 to 18 carbon atoms, still preferably 2 to 9 carbon atoms. The hydroxy cycloalkyl group preferably has 3 to 10 carbon atoms, still preferably 3 to 8 carbon atoms. The alkylene group of the polyalkylene glycol group preferably has 1 to 8 carbon atoms, still preferably 2 to 4 carbon atoms. The alkylene group of the alkoxypolyalkylene glycol group preferably has 1 to 8 carbon atoms, still preferably 2 to 4 carbon atoms, and the alkyl group of the alkoxypolyalkylene glycol group preferably has 1 to 8 carbon atoms, still preferably 2 to 4 carbon atoms. This alkyl group may form a cyclic structure. As the substituted amino group, there can be mentioned a mono- or dialkylamino group having 1 to 6 carbon atoms. As the acyl group, there can be mentioned an alkanoyl group having 1 to 6 carbon atoms. As the alkoxy group, there can be mentioned, for example, an alkoxy group having 1 to 6 carbon atoms.

The unsaturated monomer from which these unsaturated monomer constituent units (b) can be derived may be represented by the formula:

(II-a)

wherein $R^5$ is as defined in the above formula (II) and represents a hydrogen atom or a methyl group; and Z is as defined in the above formula (II) and represents an oxygen atom or a group of the formula —$NR^7$, provided that:

when Z is an oxygen atom, $R^6$ represents a substituted or unsubstituted hydroxyalkyl group, hydroxycycloalkyl group, polyalkylene glycol group of the formula —$(R^8O)nH$ (wherein $R^8$ represents an alkylene group, and n is an integer of 2 to 50) or alkoxypolyalkylene glycol group of the formula —$(R^xO)nR^y$ (wherein $R^x$ represents an alkylene group, $R^y$ represents an alkyl group, and n is an integer of 1 to 100), and when Z is a group of the formula —$NR^7$, $R^7$ represents an alkyl group unsubstituted or substituted with any of a halogen, a hydroxyl group, an amino group, a substituted amino group, an acyl group and an alkoxy group, and $R^6$ represents a hydrogen atom.

Among these unsaturated monomers (II-a), those of the formula (II-a) wherein Z represents an oxygen atom can be, for example, any of 2-hydroxyethyl acrylate, 2-hydroxyethyl methacrylate, 2-hydroxypropyl acrylate, 2-hydroxypropyl methacrylate, 3-chloro-2-hydroxypropyl methacrylate, 3-phenoxy-2-hydroxypropyl acrylate, 4-hydroxybutyl acrylate, 2-hydroxybutyl acrylate, 2-hydroxybutyl methacrylate, 6-hydroxyhexyl acrylate, 1,4-cyclohexanedimethanol monoacrylate, polyethylene glycol monomethacrylate (n=2), polyethylene glycol monomethacrylate (n=4), polyethylene glycol monomethacrylate (n=5), polyethylene glycol monomethacrylate (n=8), polyethylene glycol monomethacrylate (n=10), polyethylene glycol monomethacrylate (n=15), polypropylene glycol monomethacrylate (n=5), polypropylene glycol monomethacrylate (n=9), polypropylene glycol monomethacrylate (n=12), 2-methoxyethyl acrylate and methoxypolyethylene glycol monomethacrylate (n=45).

On the other hand, those of the formula (II-a) wherein Z represents a group of the formula —$NR^7$ can be, for example, any of N-methylolacrylamide, N-methoxymethylacrylamide, N-ethoxymethylacrylamide, N,N-dimethylaminopropylacrylamide, N,N-dimethylaminopropylmethacrylamide and diacetonacrylamide.

These unsaturated monomers (II-a) can be used individually or in combination.

Among these unsaturated monomers (II-a) hydroxylated monomers are preferred. Among the hydroxylated monomers, the use of 2-hydroxypropyl acrylate, 2-hydroxybutyl methacrylate or the like is preferred from the viewpoint that an antifouling coating film of appropriate elution performance can be obtained.

Unsaturated Monomer Constituent Units (c)

The components of the silyl ester copolymer generally comprise unsaturated monomer constituent units (c) together with the above constituent units (a) and the above constituent units (b). The unsaturated monomer constituent units (c) are different from both the constituent units (a) and the constituent units (b).

The unsaturated monomer (c-1) from which these unsaturated monomer constituent units (c) can be derived can specifically be, for example, any of:

(meth)acrylates such as methyl (meth)acrylate, ethyl (meth)acrylate and octyl (meth)acrylate;

styrenes such as styrene, vinyltoluene and α-methylstyrene;

vinyl esters such as vinyl acetate, vinyl benzoate, vinyl propionate and vinyl butyrate; and crotonic acid esters, itaconic acid esters, fumaric acid esters and maleic acid esters. Of these, (meth)acrylates, styrenes and vinyl esters are preferred from the viewpoint that an antifouling coating film of appropriate film strength can be obtained.

These unsaturated monomers can be used individually or in combination.

In the present invention, from the viewpoint of coating film strength and consumability, it is preferred that the silyl ester copolymer (A) contain 20 to 80% by weight, especially 30 to 70% by weight of constituent units (a) from a polymerizable unsaturated carboxylic acid silyl ester; 0 to 40% by weight, especially 0.1 to 20% by weight of constituent units (b) from a (meth)acrylate having a polar group; and 5 to 80% by weight, especially 10 to 60% by weight of other unsaturated monomer constituent units (c) (provided that component (a)+component (b)+component (c)=100% by weight).

Further, it is preferred that the weight average molecular weight, as measured by gel permeation chromatography (GPC), of the silyl ester copolymer (A) be 200 thousand or less, especially in the range of 5000 to 100 thousand, from the viewpoint of easiness in the preparation of antifouling paint loaded with the silyl ester copolymer (A), storage stability of obtained antifouling paint, applicability thereof, and consumption rate and cracking resistance of antifouling coating film.

Production of Silyl Ester Copolymer (A)

Silyl (meth)acrylate copolymer as the silyl ester copolymer (A) can be obtained by random copolymerization of 20 to 80% by weight of silyl (meth)acrylate (a1) represented by the above formula (I-a), 0 to 40% by weight of unsaturated monomer (b1) represented by the formula (II-a), and 5 to 80% by weight of another unsaturated monomer (c1) which is copolymerizable with the above monomers (a1) and (b1) (provided that component (a1)+component (b1)+component (c1)=100% by weight) in the presence of a radical polymerization initiator according to various methods, such as solution polymerization, bulk polymerization, emulsion polymerization and suspension polymerization.

Conventional azo compounds, peroxides and the like can widely be used as the radical polymerization initiator. Examples of the azo compounds include 2,2'-azobisisobutyronitrile, 2,2'-azobis(2-methylbutyronitrile) and 2,2'-azobis(2,4-dimethylvaleronitrile).

Examples of the peroxides include benzoyl peroxide, tert-butyl peroxyacetate, tert-butyl peroxyoctate, cumene hydroperoxide, tert-butyl peroxide, tert-butyl peroxybenzoate, tert-butyl peroxyisopropyl carbonate, tert-butyl hydroperoxide and persulfates (potassium and ammonium salts).

When the above polymer is used in an antifouling paint, the solution polymerization in which polymerization is carried out in an organic solvent, or the bulk polymerization is preferred among the above various polymerization methods. The organic solvent used in the solution polymerization method can be, for example, any of:

aromatic hydrocarbons such as xylene and toluene;

aliphatic hydrocarbons such as hexane and heptane;

esters such as ethyl acetate and butyl acetate;

alcohols such as isopropyl alcohol and butyl alcohol;

ethers such as dioxane and diethyl ether; and ketones such as methyl ethyl ketone and methyl isobutyl ketone. These solvents can be used individually or in combination.

Silyl Ester Copolymer (A-1)

In the present invention, as the silyl ester copolymer (A), there can be employed a silyl (meth)acrylate copolymer containing:

silyl (meth)acrylate constituent units (d) represented by the formula:

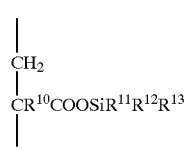

(I-a)

wherein $R^{10}$ represents a hydrogen atom or a methyl group; each of $R^{11}$ land $R^{12}$ independently represents a linear alkyl group having 1 to 10 carbon atoms, or a substituted or unsubstituted phenyl group or trimethylsilyloxy group; and $R^{13}$ represents a cyclic or acyclic, branched or unbranched alkyl group having 1 to 18 carbon atoms, or a substituted or unsubstituted phenyl group having 6 to 10 carbon atoms or trimethylsilyloxy group, and silyl (meth)acrylate constituent units (e) represented by the formula:

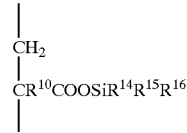

(I-b)

wherein $R^{10}$ represents a hydrogen atom or a methyl group; each of $R^{14}$ and $R^{15}$ independently represents a branched alkyl or cycloalkyl group having 3 to 10 carbon atoms; and $R^{16}$ represents a linear alkyl group having 1 to 10 carbon atoms, a branched alkyl or cycloalkyl group having 3 to 10 carbon atoms, or a substituted or unsubstituted phenyl group having 6 to 10 carbon atoms or trimethylsilyloxy group.

The constituent units (d), (e) and (f) which constitute this silyl (meth)acrylate copolymer (A-1) will be described in sequence below.

Silyl (meth)acrylate Constituent Units (d))

The silyl (meth)acrylate constituent units (d) are represented by the formula:

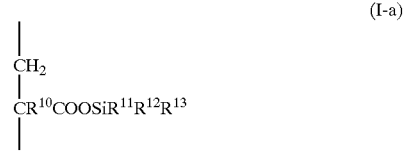

(I-a)

wherein $R^{10}$ represents a hydrogen atom or a methyl group; and each of $R^{11}$ and $R^{12}$ independently represents a linear alkyl group having 1 to 10, preferably 1 to 8, and still preferably 1 to 6 carbon atoms, or a substituted or unsubstituted phenyl group or trimethylsilyloxy group. As the linear alkyl group, there can be mentioned, for example, any of methyl, ethyl, n-propyl, n-butyl, n-pentyl, n-hexyl, n-heptyl, n-octyl, n-nonyl and n-decyl groups.

As the substituent which can replace a hydrogen atom of the phenyl group, there can be mentioned, for example, an alkyl, an aryl or a halogen.

$R^{13}$ represents a cyclic or acyclic, branched or unbranched alkyl group having 1 to 18 carbon atoms, preferably 1 to 12 carbon atoms, and still preferably 1 to 9 carbon atoms, a substituted or unsubstituted phenyl group having 6 to 10 carbon atoms, preferably 6 to 8 carbon atoms, or a trimethylsilyloxy group of the formula $(CH_3)_3SiO$—.

This alkyl group can be any of the above listed linear alkyl groups, and further can be:

a branched alkyl group such as isopropyl, isobutyl, sec-butyl, tert-butyl or neopentyl, an alicyclic alkyl group having an alicyclic structure (e.g., cyclohexane ring or norbornane ring), such as cyclohexyl or ethylidenenorbornyl, or the like.

Of these, $R^{11}$, $R^{12}$ and $R^{13}$, although may be identical with or different from each other, preferably each represent methyl, ethyl, n-propyl, n-butyl, n-hexyl or trimethylsilyloxy, and still preferably each represent methyl, n-propyl, n-butyl or n-hexyl.

The silyl (meth)acrylate (d1) from which the above silyl (meth)acrylate constituent units (d) can be derived can be represented by the formula:

wherein $R^{10}$ to $R^{13}$ are as defined in the above formula (I-a).

Specifically, the silyl (meth)acrylate of the formula (I-a-1) can be, for example, any of:

aliphatic silyl (meth)acrylates wherein $R^{11}$, $R^{12}$ and $R^{13}$ are identical with each other, such as:
trimethylsilyl (meth)acrylate,
triethylsilyl (meth)acrylate,
tri-n-propylsilyl (meth)acrylate,
tri-n-butylsilyl (meth)acrylate,
tri-n-pentylsilyl (meth)acrylate,
tri-n-hexylsilyl (meth)acrylate,
tri-n-heptylsilyl (meth)acrylate,
tri-n-octylsilyl (meth)acrylate,
tri-n-nonylsilyl (meth)acrylate, and
tri-n-decylsilyl (meth)acrylate, aromatic or siloxane silyl (meth)acrylates wherein $R^{11}$, $R^{12}$ and $R^{13}$ are identical with each other, such as:
triphenylsilyl (meth)acrylate, and
tris(trimethylsilyloxy)silyl (meth)acrylate, and aliphatic silyl (meth)acrylates wherein $R^{11}$, $R^{12}$ and $R^{13}$ are partially or wholly different from each other, such as:
dimethyl-n-propylsilyl (meth)acrylate,
isopropyldimethylsilyl (meth)acrylate,
di-n-butyl-isobutylsilyl (meth)acrylate,
n-hexyl-dimethylsilyl (meth)acrylate,
sec-butyl-dimethylsilyl (meth)acrylate,
monomethyldi-n-propylsilyl (meth)acrylate,
methylethyl-n-propylsilyl (meth)acrylate,
ethylidenenorbornyl-dimethylsilyl (meth)acrylate, and
trimethylsilyloxy-dimethylsilyl (meth)acrylate ($CH_2$=C($CH_3$)COOSi($CH_3$)$_2$(OSi($CH_3$)$_3$) or $CH_2$=CHCOOSi($CH_3$)$_2$(OSi($CH_3$)$_3$)).

In the present invention, these silyl (meth)acrylates (I-a-1) can be used individually or in combination.

Silyl (meth)acrylate Constituent Units (e)

The silyl (meth)acrylate constituent units (e) are represented by the formula:

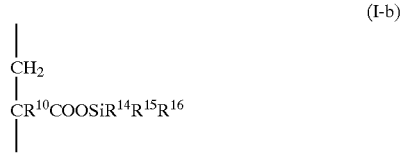

wherein $R^{10}$ represents a hydrogen atom or a methyl group; and each of $R^{14}$ and $R^{15}$ independently represents a branched alkyl group having 3 to 10, preferably 3 to 8 carbon atoms, or a cycloalkyl group having 3 to 10, preferably 3 to 9 carbon atoms.

This branched alkyl group is as defined in the above formula (I), and can be, for example, any of isopropyl, isobutyl, sec-butyl, tert-butyl and neopentyl.

The above cycloalkyl group can be, for example, cyclohexyl or ethylidenenorbornyl.

$R^{16}$ represents a linear alkyl group having 1 to 10, preferably 1 to 8, and still preferably 1 to 6 carbon atoms; a branched alkyl or cycloalkyl group having 3 to 10, preferably 3 to 9 carbon atoms; a substituted or unsubstituted phenyl group having 6 to 10, preferably 6 to 8 carbon atoms; or a trimethylsilyloxy group.

As the linear alkyl group, branched alkyl or cycloalkyl group and phenyl group represented by $R^{16}$, there can be mentioned, for example, the same specific groups as listed above.

Of these, when $R^{14}$, $R^{15}$ and $R^{16}$, although may be identical with or different from each other, are identical with each other, it is preferred that isopropyl, sec-butyl or isobutyl be represented thereby. It is especially preferred that isopropyl or sec-butyl be represented thereby.

When $R^{14}$, $R^{15}$ and $R^{16}$ are partially or wholly different from each other, it is preferred that $R^{14}$ and $R^{15}$, although may be identical with or different from each other, each represent isopropyl, isobutyl, sec-butyl or tert-butyl. It is preferred that $R^{16}$ represent a group selected from among methyl, ethyl, propyl, isopropyl, n-butyl, isobutyl and trimethylsilyloxy.

The silyl (meth)acrylate (e1) from which the above silyl (meth)acrylate constituent units (e) can be derived can be represented by the formula:

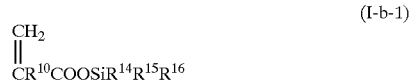

wherein $R^{10}$, $R^{14}$, $R^{15}$ and $R^{16}$ are as defined in the above formula (I-b).

The silyl (meth)acrylate of the formula (I-b-1) can specifically be, for example, any of:
silyl (meth)acrylates wherein $R^{14}$, $R^{15}$ and $R^{16}$ are identical with each other, such as:
triisopropylsilyl (meth)acrylate,
triisobutylsilyl (meth)acrylate, and
tri-sec-butylsilyl (meth)acrylate, and silyl (meth)acrylates wherein $R^{14}$, $R^{15}$ and $R^{16}$ are partially or wholly different from each other, such as:
diisopropyl-cyclohexylsilyl (meth)acrylate,
diisopropyl-phenylsilyl (meth)acrylate,
diisopropyl-trimethylsiloxysilyl (meth)acrylate,
di-sec-butyl-methylsilyl (meth)acrylate,
di-sec-butyl-ethylsilyl (meth)acrylate,
di-sec-butyl-trimethylsilyloxysilyl (meth)acrylate, and
isopropyl-sec-butyl-methylsilyl (meth)acrylate.

In the present invention, these silyl (meth)acrylates (I-b-1) can be used individually or in combination.

Among the above silyl (meth)acrylates, from the viewpoint of easiness in the synthesis of silyl (meth)acrylate copolymer and from the viewpoint of the film forming properties, storage stability and easiness in abradability control of the antifouling coating composition loaded with the silyl (meth)acrylate copolymer, it is preferred to employ a combination of:

at least one silyl (meth)acrylate (I-a-1) selected from among:
trimethylsilyl (meth)acrylate,
triethylsilyl (meth)acrylate,
tri-n-propylsilyl (meth)acrylate,
tri-n-butylsilyl (meth)acrylate,
n-hexyl-dimethylsilyl (meth)acrylate,
n-octyl-dimethylsilyl (meth)acrylate,
isopropyl-dimethylsilyl (meth)acrylate, ethylidenenorbornyl-dimethylsilyl (meth)acrylate,
trimethylsilyloxy-dimethylsilyl (meth)acrylate,
bis(trimethylsilyloxy)-methylsilyl (meth)acrylate, and
tris(trimethylsilyloxy)silyl (meth)acrylate,
with at least one silyl (meth)acrylate (I-b-1) selected from among:
triisopropylsilyl (meth)acrylate,
triisobutylsilyl (meth)acrylate,
tri-sec-butylsilyl (meth)acrylate,
di-sec-butyl-methylsilyl (meth)acrylate,
diisopropyl-trimethylsilyloxysilyl (meth)acrylate, and
di-sec-butyl-trimethylsilyloxysilyl (meth)acrylate.

It is still preferred to employ a combination of tri-n-butylsilyl (meth)acrylate as the silyl (meth)acrylate (I-a-1) with triisopropylsilyl (meth)acrylate as the silyl (meth)acrylate (I-b-1).

(Unsaturated Monomer Constituent Units (f))

The unsaturated monomer constituent units (f), together with the above constituent units (d) and constituent units (e), constitute the silyl (meth)acrylate copolymer of the present invention. These unsaturated monomer constituent units (f) are different from both the constituent units (d) and constituent units (e), As the unsaturated monomer (f1) from which the unsaturated monomer constituent units (f) can be derived, there can be mentioned the (meth)acrylate having a polar group (b), represented by the above formula (II-a), and the unsaturated monomer (c-1) from which the unsaturated monomer constituent units (c) can be derived.

The unsaturated monomer (f1) can specifically be, for example, any of:

hydrophobic (meth)acrylates such as methyl (meth)acrylate, ethyl (meth)acrylate, n-, iso- or tert-butyl (meth)acrylate, 2-ethylhexyl (meth)acrylate and cyclohexyl (meth)acrylate;

hydrophilic (meth)acrylates such as 2-hydroxyethyl (meth)acrylate, 2-hydroxypropyl (meth)acrylate, 2-hydroxybutyl (meth)acrylate, 4-hydroxybutyl (meth)acrylate, 2-methoxyethyl (meth)acrylate, alkoxypolyethylene glycol mono(meth)acrylate and alkoxypolypropylene glycol mono(meth)acrylate;

styrenes such as styrene, vinyltoluene and α-methylstyrene;

vinyl esters such as vinyl acetate, vinyl benzoate, vinyl propionate and vinyl butyrate; and carboxylic acid esters such as itaconic acid esters and maleic acid esters. Of these, (meth)acrylates, styrenes and carboxylic acid vinyl esters are preferred from the viewpoint that an antifouling coating film of appropriate film strength can be obtained.

In particular, when hydrophilic (meth)acrylates are employed, the consumability of coating film can be increased. For this purpose, also, use can be made of a hydrophilic comonomer such as an acrylamide derivative.

These unsaturated monomers (f1) can be used individually or in combination.

From the viewpoint of prevention of coating film cracking, resistance to coating film peeling, coating film strength and consumability, it is preferred that the silyl (meth)acrylate copolymer of the present invention contain 0.5 to 50% by weight, especially 0.5 to 25% by weight of silyl (meth)acrylate constituent units (d); 10 to 70% by weight, especially 30 to 65% by weight of silyl (meth)acrylate constituent units (e); and 20 to 70% by weight, especially 30 to 60% by weight of unsaturated monomer constituent units (f) other than the constituent units (d) and (e) (provided that component (d1)+component (e)+component (f)=100% by weight).

Further, it is preferred that the weight average molecular weight, as measured by gel permeation chromatography (GPC), of the silyl (meth)acrylate copolymer (A-1) be 200 thousand or less, especially in the range of 3000 to 100 thousand, and still especially 5000 to 50 thousand from the viewpoint of easiness in the preparation of antifouling paint loaded with the silyl (meth)acrylate copolymer, applicability of obtained antifouling paint, and consumption rate and cracking resistance of antifouling coating film.

Production of Silyl (meth)acrylate Copolymer (A-1)

The above silyl (meth)acrylate copolymer (A-1) can be obtained by random copolymerization of 0.5 to 50% by weight of silyl (meth)acrylate (d1) represented by the above formula (I-a-1), 10 to 70% by weight of silyl (meth)acrylate (e1) represented by the formula (I-b-1), and 20 to 70% by weight of another unsaturated monomer (f1) which is copolymerizable with the above monomers (d1) and (e1) (provided that component (d1)+component (e1)+component (f1)=100% by weight) in the presence of a radical polymerization initiator according to various methods, such as solution polymerization, bulk polymerization, emulsion polymerization and suspension polymerization.

Conventional azo compounds, peroxides and the like can widely be used as the radical polymerization initiator. Examples of the azo compounds include
2,2'-azobisisobutyronitrile,
2,2'-azobis(2-methylbutyronitrile) and
2,2'-azobis(2,4-dimethylvaleronitrile).

Examples of the peroxides include benzoyl peroxide, tert-butyl peroxyacetate, tert-butyl peroxyoctate, cumene hydroperoxide, tert-butyl peroxide, tert-butyl peroxybenzoate, tert-butyl peroxyisopropyl carbonate, tert-butyl hydroperoxide and persulfates (potassium and ammonium salts).

When the above polymer is used in an antifouling paint, the solution polymerization in which polymerization is carried out in an organic solvent, or the bulk polymerization is preferred among the above various polymerization methods. The organic solvent used in the solution polymerization can be, for example, any of:

aromatic hydrocarbons such as xylene and toluene;
aliphatic hydrocarbons such as hexane and heptane;
esters such as ethyl acetate and butyl acetate;
alcohols such as isopropyl alcohol and butyl alcohol;
ethers such as dioxane and diethyl ether; and
ketones such as methyl ethyl ketone and methyl isobutyl ketone. These solvents can be used individually or in combination.

Carboxylic Acid (B), Bivalent or Trivalent Metal Compound (C) and Formed Carboxylic Acid Excess-metal Salt
<Carboxylic Acid (B)>

In the antifouling coating composition of the present invention, the carboxylic acid (B) reacts with a bivalent or trivalent metal compound (C) described later to thereby form a carboxylic acid metal salt, preferably a carboxylic acid excess-metal salt.

The carboxylic acid excess-metal salt refers to a salt from a bivalent metal or metal of higher valency and a carboxylic acid, preferably an aliphatic or alicyclic carboxylic acid (known as a metallic soap), wherein the metal is contained in more than the equivalent of carboxyl group.

The dehydrating agent (D) contained in the antifouling coating composition is presumed as coupling with water in the coating composition, especially water formed by reaction between the carboxylic acid (B) and the bivalent or trivalent metal compound (C) at the stage of formation of the carboxylic acid excess-metal salt to thereby not only accelerate the component (B)/component (C) reaction but also act to, for example, suppress the hydrolysis of silyl ester copolymer (A) by formed water or the like.

Carboxylic acids having 2 or more, especially 3 to 50 carbon atoms are preferred as the above carboxylic acid. As the carboxylic acid, there can be mentioned, for example, aliphatic, alicyclic and aromatic carboxylic acids. With respect to carboxylic acids other than resin acids, aliphatic carboxylic acids are preferred. Such carboxylic acids may be monocarboxylic, or dicarboxylic or those of higher carboxyl value.

Examples of such carboxylic acids include resin acids, resin acid derivatives and other organic acids. Specifically, examples of such carboxylic acids include:

abietic acid; paramatrinic-acid, pimaric acid, isopimaric acid and neoabietic acid which are isomers of abietic acid; and tall oil rosin, gum rosin and wood rosin each containing dehydroabietic acid;

disproportionated rosin containing dihydroabietic acid and dehydroabietic acid;

hydrogenated rosin containing dihydroabietic acid and tetrahydroabietic acid;

low-softening-point rosin containing secodehydroabietic acid as a low-softening-point component;

copal resin containing agathenedicarboxylic acid and an agathenedicarboxylic acid monoalkyl ester, and fractions thereof;

sandarach resin containing sandaracopimalic acid as an isomer of abietic acid, and fractions thereof; and balsam containing cinnamic acid; dragon's blood containing benzoic acid; and other resin acids and derivatives thereof.

Among these resin acids and derivatives thereof, gum rosin, tall oil rosin, copal resin and fractions thereof, disproportionated rosin, low-softening-point rosin and the like are preferred. In the present invention, these resin acids and derivatives thereof can be used individually or in combination.

Among these resin acids and derivatives thereof, further, it is preferred that the carboxylic acid (B) be a resin acid or resin acid derivative containing at least one carboxylic acid selected from the group consisting of abietic acid, dehydroabietic acid, dihydroabietic acid, tetrahydroabietic acid, noragathic acid, agathenedicarboxylic acid, an agathenedicarboxylic acid monoalkyl ester, secodehydroabietic acid and isomers thereof.

In particular, when the above resin acids are employed as the carboxylic acid, there can be exerted such an effect that the antifouling properties, cracking resistance and abradability can be enhanced.

As organic acids other than the resin acids, there can be mentioned, for example, lauricacid, stearicacid, oleic acid, linoleic acid, linolenic acid, isononanoic acid, versatic acid, tall oil fatty acid, isostearic acid, naphthenic acid, 2-ethylhexanoic acid, coconut oil fatty acid, soybean oil fatty acid and derivatives thereof.

Among these carboxylic acids and branched aliphatic carboxylic acid, further, it is preferred that the carboxylic acid (B) be at least one organic acid (excluding the resin acid) selected from the group consisting of isononanoic acid, versatic acid, naphthenic acid, oleic acid, linoleic acid, linolenic acid, tall oil fatty acid and soybean oil fatty acid.

In particular, when these organic acids other than the resin acids are used as the carboxylic acid, there can be exerted such an effect that the antifouling properties and cracking resistance can be enhanced.

It is preferred that the carboxylic acid (B) be contained in the antifouling coating composition in such an amount that the equivalent ratio of bivalent or trivalent metal compound (C) described later to carboxyl group (metal equivalent value/carboxyl equivalent value) is 1.2 or greater, especially in the range of 1.25 to 5.0, and still especially 1.3 to 2.0.

It is generally preferred that the carboxylic acid (B) be contained in an amount of 0.04 to 2000 parts by weight, especially 1 to 600 parts by weight, per 100 parts by weight of silyl ester copolymer (A) (solid contents) contained in the antifouling coating composition.

When the carboxylic acid (B) is contained in the antifouling coating composition in the above amounts, not only is the obtained paint excellent in storage stability but also the obtained coating film tends to exhibit satisfactory cracking resistance and satisfactory antifouling properties for a prolonged period of time.

<Bivalent or Trivalent Metal Compound (C)>

It is preferred that as mentioned above, the bivalent or trivalent metal compound (C) react with the carboxylic acid (B) to thereby form a carboxylic acid metal salt, especially a carboxylic acid excess-metal salt.

The bivalent or trivalent metal compound (C) refers to a compound of bivalent or trivalent metal. As the bivalent metal, there can be mentioned, for example, zinc, copper, calcium, barium, iron, cobalt, lead or magnesium. In particular, at least one metal selected from the group consisting of zinc, copper, magnesium, calcium and barium is preferred.

As the metal compound (C), there can be mentioned, for example, an oxide, hydroxide or carbonate of bivalent or trivalent metal.

Specific examples of suitable metal compounds include zinc oxide, zinc hydroxide, copper oxide, copper hydroxide and basic copper carbonate.

In the present invention, the above metal compound (C) is used inappropriate combination with the above carboxylic acid, depending on the conditions employed for preparation of antifouling coating composition (e.g., temperature, dispersing power and time), demanded performance of coating film, etc.

It is preferred that the metal compound (C) be contained in the antifouling coating composition in the above amount in terms of the equivalent ratio of bivalent or trivalent metal compound (C) to carboxyl group (metal equivalent value/carboxyl equivalent value) from the same viewpoint.

Also, it is preferred that the bivalent or trivalent metal compound (C) be contained in an amount of 1.5 to 1200 parts by weight, especially 4 to 600 parts by weight, per 100 parts by weight of silyl ester copolymer (A).

Terpene (mineral spirit), toluene or xylene is preferably used as the solvent added to the antifouling coating composition according to necessity. The amount of solvent is not particularly limited, and, for example, the solvent is used so that the ratio of solvent to formed solution of carboxylic acid excess-metal salt (namely, antifouling coating composition) falls in the range of 0.1 to 80% by weight, preferably 5 to 60% by weight.

With respect to the carboxylic acid excess-metal salt formed by reaction between the carboxylic acid (B) and the bivalent or trivalent metal compound (C), when the carboxylic acid is, for example, monocarboxylic, it is presumed that part or all of the carboxylic acid metal salt $(ROO)nM$ is in the form represented by $(ROO)nM.MO_{n/2}$ or $(ROO)nM.M(OH)n$ (wherein M represents a metal, and n represents the valence of metal), etc. When use is made of a monocarboxylic acid and a bivalent metal, formation of a salt structure of the formula $M_4(O)(RCOO)_6$ or the like can be presumed.

In the measurement by infrared absorption spectroscopy of formed carboxylic acid excess-metal salt contained in the antifouling coating composition or antifouling coating film according to the present invention, the absorptions (3500 cm$^{-1}$ and 1700 cm$^{-1}$) of free (namely, not having been formed into a metal salt) carboxyl group (COOH group) are extremely weak or not observed at all. The equivalent of metal relative to carboxylic group can be calculated by determining the amount of metal contained in the carboxylic acid excess-metal salt through, for example, a chelatometric titration analysis of solvent soluble contents.

Hitherto, with respect to, for example, a compound constituted of a monocarboxylic acid (RCOOH) and a bivalent metal (M), an equal-equivalent reaction product represented by the formula (RCOO)$_2$M has been proposed as a carboxylic acid metal salt for use in antifouling paints.

In contrast, when in an antifouling coating composition the carboxylic acid (B) and the bivalent or trivalent metal compound (C) are contained in such a proportion that the carboxylic acid excess-metal salt is formed, there can be obtained a paint having the following excellent characteristics.

(1) The carboxylic acid excess-metal salt which is a compound of lower viscosity than that of the conventional equal-equivalent reaction product can be obtained, so that a paint of low viscosity can be prepared with the result that a paint of lowered solvent content can be obtained.

(2) A large amount of unreacted carboxylic acid is present in the conventional equal-equivalent reaction product (carboxylic acid metal salt), so that there has been a tendency toward deteriorations of storage stability and antifouling properties attributed to the reaction with active components of the paint. By contrast, when the organic carboxylic acid (B) and the bivalent or trivalent metal compound (C) are contained in such a proportion that the carboxylic acid excess-metal salt is formed according to the present invention, the amount of unreacted carboxylic acid is extremely small, or any unreacted carboxylic acid is substantially not present. Thus, the above disadvantage can be avoided, and neither deterioration of storage stability nor deterioration of antifouling properties would be invited.

In particular, when not only zinc oxide (zinc white) added for the purpose of formation of carboxylic acid excess-metal salt but also zinc oxide (zinc white) added for the purpose of increase of coating film strength, regulation of coating film consumption and coloring, etc. is present in a paint, water would be formed by reaction between unreacted carboxylic acid and zinc oxide. This water or the like, for example, may accelerate the hydrolysis of component (A), thereby deteriorating the storage stability of paint.

However, the antifouling coating composition of the present invention is loaded with not only the carboxylic acid (B) and the above proportion of metal compound (C) but also a dehydrating agent (D). Consequently, the reaction between the organic carboxylic acid (B) and the bivalent or trivalent metal compound (C) is effectively advanced to thereby result in formation of the carboxylic acid excess-metal salt. Thus, any unreacted carboxylic acid is substantially not present, so that after the consumption of carboxylic acid (B) by reaction with the component (C), there would be no reaction with remaining zinc oxide. Therefore, a paint of excellent storage stability can be obtained.

(3) The formed carboxylic acid excess-metal salt per se is hygroscopic, thereby contributing to enhancement of the storage stability of paint owing to the dehydrating action of carboxylic acid excess-metal salt in the paint. In particular, with respect to, for example, a system (system consisting of carboxylic acid (B) and bivalent or trivalent metal compound (C)) wherein an isononanoic acid excess-metal salt is formed, the hygroscopic property is conspicuous, so that a stable coating composition can be obtained.

In the present invention, depending on the conditions for preparation of the antifouling coating composition, various carboxylic acid derivatives can be used in place of the above carboxylic acid (B) so as to form the carboxylic acid excess-metal salt through reaction between the carboxylic acid derivatives and the bivalent or trivalent metal compound (C) in the antifouling coating composition or the coating film.

In that instance, the modes of reaction between the carboxylic acid or derivatives thereof and the bivalent or trivalent metal compound (C) in the antifouling coating composition, as described in the applicant's prior application Japanese Patent Application 2000-290907 (filed on Sep. 25, 2000), columns 0106 to 0111, can include:

(i) direct reaction between a carboxylic acid or derivative thereof and the above metal, (ii) reaction between a carboxylic acid or derivative thereof and an oxide, hydroxide or carbonate of the above metal, (iii) reaction between an alkali metal salt of carboxylic acid and a water-soluble salt of the above metal, etc.

In the present invention, the reaction (ii) between a carboxylic acid or derivative thereof and an oxide, hydroxide or carbonate of metal is preferred from the viewpoint of easiness in controlling of equivalent ratio, high reactivity and stable reaction.

The above carboxylic acids can be used, and as the carboxylic acid derivatives, there can be mentioned, for example, alkali metal salts, quaternary ammonium salts, quaternary phosphonium salts and esters. Examples of the alkali metal salts include sodium and potassium salts. The quaternary ammonium salts may be substituted with alkyl groups having 1 to 15, preferably 1 to 10 carbon atoms. The quaternary phosphonium salts may be substituted with alkyl groups having 1 to 15, preferably 1 to 10 carbon atoms. As the esters, there can be mentioned those of neutral fat or oil structure.

As the water-soluble salt of metal, there can be mentioned, for example, a chloride, a bromide, a nitrate, a sulfate, a phosphate, a carbonate or a bicarbonate.

These antifouling coating compositions may contain the above solvents according to necessity.

(Dehydrating Agent (D))

The dehydrating agent (D) functions, for example, to remove water formed by reaction between the carboxylic acid (B) and the bivalent or trivalent metal compound (C), especially zinc oxide, as mentioned above, to accelerate the formation of carboxylic acid excess-metal salt and to prevent the hydrolysis of silyl ester copolymer (A), thereby contributing to the storage stability of antifouling coating composition.

A wide variety of known dehydrating agents can be used as the dehydrating agent (D). The antifouling coating composition of the present invention is loaded with an inorganic or organic dehydrating agent, preferably an inorganic dehydrating agent. By virtue of the loading with the dehydrating agent, the antifouling coating composition of the present invention is excellent in storage stability.

Specifically, the dehydrating agent can be, for example, any of anhydrous gypsum (CaSO$_4$), synthetic zeolite adsorbents (trade name: Molecular Sieve, etc.), orthoesters such as methyl orthoformate and methyl orthoacetate, orthoboric esters, silicates and isocyanates (trade name: Additive T1). In particular, anhydrous gypsum and Molecular Sieve are preferably used as the inorganic dehydrating agent. Such inorganic dehydrating agents can be used individually or in combination.

It is preferred that this dehydrating agent, especially the inorganic dehydrating agent be contained in an amount of 0.15 to 50 equivalents, especially 0.2 to 30 equivalents, per equivalent of carboxyl group of the carboxylic acid (B) contained in the antifouling coating composition.

It is generally preferred that this dehydrating agent, especially the inorganic dehydrating agent be added in an amount of 0.02 to 100 parts by weight, especially 0.2 to 50 parts by weight, per 100 parts by weight of silyl ester copolymer (A).

Further, it is generally preferred that such inorganic dehydrating agents, in total, be contained in an amount of 0.01 to 20% by weight, especially 0.1 to 8% by weight, based on the antifouling coating composition.

When the dehydrating agent, especially the inorganic dehydrating agent is contained in the antifouling coating composition in the above amount, there is a tendency toward striking enhancement of the storage stability of the antifouling coating composition.

(Antifouling Coating Composition)

The antifouling coating composition of the present invention comprises the above silyl ester copolymer (A) (including copolymer (A-1)), carboxylic acid (B), bivalent or trivalent metal compound (C) and dehydrating agent (D).

In the antifouling coating composition (containing solvent and various additives described later) of the present invention, it is preferred that the silyl ester copolymer (A) be contained in an amount of 2 to 60% by weight, especially 5 to 40% by weight.

Further, in the antifouling coating composition, it is preferred that:

the carboxylic acid (B) be contained in an amount of 0.1 to 60% by weight, especially 0.5 to 40% by weight;

the bivalent or trivalent metal compound (C) be contained in an amount of 0.1 to 60% by weight, especially 0.5 to 40% by weight; and the dehydrating agent (D) be contained in an amount of 0.01 to 30% by weight, especially 0.1 to 10% by weight.

Still further, in the antifouling coating composition, it is preferred that per 100 parts by weight of silyl ester copolymer (A) (solid contents):

the carboxylic acid (B) be contained in an amount of 0.04 to 2000 parts by weight, especially 10 to 600 parts by weight;

the bivalent or trivalent metal compound (C) be contained in an amount of 3.0 to 2400 parts by weight, especially 8 to 1200 parts by weight; and the dehydrating agent (D) be contained in an amount of 0.02 to 100 parts by weight, especially 0.2 to 50 parts by weight.

When the components (A), (B), (C) and (D) are contained in the antifouling coating composition in these amounts, there can be realized such a tendency that not only is the storage stability of paint excellent but also the antifouling coating film exhibits less cracking occurrence, excellent adherence so as to ensure less peeling occurrence and desirably controlled hydrolysis rate so as to be excellent in antifouling performance, in particular, antifouling properties in stationary environment or highly fouling environment and long-term antifouling properties with a good balance therebetween.

<Various Additives>

The antifouling coating composition (P) of the present invention, comprising the above silyl ester copolymer (A), carboxylic acid (B), bivalent or trivalent metal compound (C) and dehydrating agent (D) as essential components, may further contain various additives as other components.

As the various additives, there can be mentioned, for example, an antifouling agent (E), zinc oxide (zinc white) (F), an antisagging/antisetting agent, an elution accelerating component (G), a plasticizer such as chlorinated paraffin, various pigments such as a color pigment and a body pigment, various resins such as an acrylic resin and a polyalkyl vinyl ether (vinyl ether (co)polymer), and other various additives such as a defoamer, an antiflooding agent and a leveling agent.

(Antifouling Agent (E))

Although the antifouling agent (E) may be inorganic or organic and a wide variety of known antifouling agents can be used, it is preferred in the present invention to employ copper and/or a copper compound (E1), or an organic antifouling agent such as a metal pyrithione (E2) (organic antifouling agents excluding copper compounds, the same applies hereinafter).

The copper and/or copper compound (E1) to be added to the antifouling coating composition of the present invention will now be described. The molecular weight of the copper and/or copper compound is generally in the range of 63.5 to 2000, preferably 63.5 to 1000.

Both organic and inorganic copper compounds can be used as the copper compound (E1) among the components (E1). Examples of the inorganic copper compounds include cuprous oxide, copper thiocyanate (cuprous thiocyanate or copper rhodanate), basic copper sulfate, copper chloride and copper oxide.

Examples of the organic copper compounds include basic copper acetate, oxine copper, copper nonylphenolsulfonate, products of reaction between a resin acid such as rosin and copper or a copper compound, copper bis(ethylenediamine)-bis(dodecylbenzenesulfonate), copper naphthenate, copper bis(pentachlorophenolate) and copper pyrithione. Among these, inorganic cuprous oxide, products of reaction between a resin acid such as rosin and copper or a copper compound, and copper thiocyanate (copper rhodanate) are preferably used.

When carboxylic acid copper salts, such as copper acetate, copper naphthenate and products of reaction between a resin acid such as rosin and copper or a copper compound, are used as the antifouling agent, the employed carboxylic acid copper salts may be in the form of a salt consisting of a carboxylic acid and copper used in equal equivalents in place of the above carboxylic acid excess-metal salt formed by reaction between the carboxylic acid (B) and the metal compound (C).

These copper compounds, in place of copper or together with copper, can be used individually or in combination.

In the antifouling coating composition of the present invention, it is preferred that these copper and/or copper compounds (E1) including those added for the formation of carboxylic acid excess-copper salt, in total, be generally contained in an amount of 1 to 70% by weight, especially 3 to 65% by weight.

Per 100 parts by weight of silyl ester copolymer (A) contained in the antifouling coating composition, it is preferred that these copper and/or copper compounds (E1), in total, be generally contained in an amount of 3 to 1400 parts by weight, especially 10 to 1300 parts by weight.

When the copper and/or copper compounds are contained in the antifouling coating composition in the amount falling within the above ranges, an antifouling coating film having excellent antifouling properties can be formed.

In the present invention, as the antifouling agent, an organic antifouling agent (E2) (excluding organocopper compounds such as copper pyrithione included in the component (E1)) can be used together with the copper and/or copper compound (E1) or in place of the copper and/or copper compound (E1).

As the organic antifouling agent, there can be employed, for example, metal pyrithiones. Examples of the metal pyrithiones include sodium, magnesium, calcium, barium, aluminum, copper, zinc, iron and lead pyrithiones. Of these metal pyrithiones, copper pyrithione is preferred.

In the antifouling coating composition of the present invention, it is preferred that these pyrithione compounds, in total, be generally contained in an amount of 0.1 to 15% by weight, especially 0.5 to 10% by weight. Per 100 parts by weight of silyl ester copolymer (A) contained in the antifouling coating composition, it is preferred that these pyrithione compounds, in total, be generally contained in an amount of 0.3 to 300 parts by weight, especially 2 to 200 parts by weight.

In the present invention, the following organic antifouling agents (other organic antifouling agents) may be contained together with the pyrithione compounds or in place of the pyrithione compounds. Various known antifouling agents can be used as the other organic antifouling agents.

Examples of the other organic antifouling agents include tetramethylthiuram disulfide, carbamate compounds (e.g., zinc dimethyldithiocarbamate and manganese 2-ethylenebisdithiocarbamate), 2,4,5,6-tetrachloroisophthalonitrile, N,N-dimethyldichlorophenylurea, 2-methylthio-4-tert-butylamino-6-cyclopropylamino-s-tri azine, 4,5-dichloro-2-n-octyl-4-isothiazolin-3-one, 2,4,6-trichlorophenylmaleimide, pyridine-triphenylborane and amine-triphenylborane.

In the present invention, these organic antifouling agents can be used individually or in combination, together with pyrithione compounds (metal pyrithiones) such as copper pyrithione. For example, copper pyrithione can be used in combination with 4,5-dichloro-2-n-octyl-4-isothiazolin-3-one.

The total content of various antifouling agents, such as copper and/or copper compounds (E1) and pyrithione compounds, in the antifouling coating composition, although it depends on the types of coating film forming copolymer and antifouling agent used in the preparation of antifouling coating composition and the type of, for example, marine vessel to be coated with the antifouling coating composition (with, respect to marine vessel, whether overseas voyage, or coastwise service, or various sea water areas, whether wooden or steel made, etc.) and cannot be unconditionally determined, is preferably in the range of 10 to 1400 parts by weight, still preferably 20 to 1300 parts by weight, per 100 parts by weight of the above silyl ester copolymer (A).

When the total content of antifouling agents is less than 10 parts by weight, poor antifouling properties may result. On the other hand, when the total content of antifouling agents exceeds 1400 parts by weight, further enhancement of antifouling properties cannot be anticipated, and poor cracking resistance may result.

For example, when copper pyrithione is used in combination with cuprous oxide ($Cu_2O$) as the antifouling agent in the antifouling coating composition, it is preferred that in the antifouling coating composition the copper pyrithione be contained in an amount of 2 to 200 parts by weight per 100 parts by weight of silyl ester copolymer (A), while the cuprous oxide be contained generally in an amount of about 10 to 1300 parts by weight per 100 parts by weight of silyl ester copolymer (A).

(Zinc Oxide (Zinc White) (F))

The antifouling coating composition of the present invention may be further loaded with zinc oxide (zinc white) (F) for the purpose of fulfilling functions other than those of the above bivalent or trivalent metal compound (C), for example, for allowing it to function as an enhancer of coating film strength, a regulator of coating film consumption, a colorant, a body pigment, etc. With respect to the antifouling coating composition loaded with zinc oxide, the obtained coating film exhibits enhanced strength, and the abradability of coating film can be effectively controlled.

It is preferred that zinc oxide (F) be contained in the antifouling coating composition of the present invention in an excess amount of up to 5000 equivalents, especially 2 to 5000 equivalents, and still especially 10 to 3000 equivalents per equivalent of carboxyl group of the carboxylic acid (B) for the purpose of fulfilling functions other than those of the above bivalent or trivalent metal compound (C) and for allowing it to function as an enhancer of coating film strength, a regulator of coating film consumption, a body pigment or color pigment such as a colorant, etc.

From the viewpoint of regulation of coating film consumption and regulation of coating film hardness, it is generally preferred that the zinc oxide be contained in the antifouling coating composition in a total amount, including that added as the bivalent or trivalent metal compound (C), of 0.1 to 35% by weight, especially 0.5 to 25% by weight. Also, it is generally preferred that the zinc oxide be contained in an amount of 1.5 to 1200 parts by weight, especially 4 to 600 parts by weight per 100 parts by weight of silyl ester copolymer (A) in the antifouling coating composition.

(Elution Accelerating Component (G))

The antifouling coating composition of the present invention may contain an elution accelerating component (G).

Provided, however, that the elution accelerating component (G) excludes the above resin acids, other organic acids (e.g., isononanoic acid, versatic acid and naphthenic acid) and the like (the same applies hereinafter).

The elution accelerating component (G) can be, for example, any of rosin derivatives and carboxylic acid metal salts other than the above carboxylic acids (B).

Examples of the rosin derivatives include polymerized rosin, maleic rosin, aldehyde-modified rosin, polyoxyalkylene esters of rosin, reduced rosin (rosin alcohol), metal salts of rosin (e.g.,copper, zinc, magnesium and potassium salts of rosin) and rosin amine. These rosin derivatives can be used individually or in combination.

Examples of the carboxylic acid metal salts include copper (Cu), zinc (Zn), magnesium (Mg) and calcium (Ca) salts. As the carboxylic acid metal salts, use can be made of those which are not the above carboxylic acid excess-metal salts and which consist of a carboxylic acid and a metal, the equivalent ratio of metal to carboxylic acid being 1 or less.

Among these elution accelerating components, rosin derivatives are preferred. These elution accelerating components can be used individually or in combination.

It is preferred that these elution accelerating components be contained in an amount of 0.1 to 30 parts by weight, especially 0.1 to 20 parts by weight, and still especially 0.5 to 15 parts by weight, per 100 parts by weight of antifouling coating composition. The content of elution accelerating components is preferred to fall within these ranges from the viewpoint of the antifouling performance and water resistance of coating film.

Per 100 parts by weight of silyl ester copolymer (A) contained in the antifouling coating composition, it is generally preferred that the elution accelerating components, in total, be contained in an amount of 0.3 to 600 parts by weight, especially 2 to 300 parts by weight.

When the content of elution accelerating components in the antifouling coating composition falls within these ranges, the antifouling performance and coating film consumability tend to be enhanced.

(Vinyl Ether (co)polymer (H))

The vinyl ether (co)polymer comprises vinyl ether constituent units, contributes to enhancement of the cracking resistance, peeling resistance and elution velocity stability of obtained coating film, and further functions as a coating film forming component.

The vinyl ether (co)polymer can be, for example, any of polyvinyl methyl ether, polyvinyl ethyl ether, polyvinyl isopropyl ether and polyvinyl isobutyl ether.

It is generally preferred that the vinyl ether (co)polymer (H) be contained in a total amount of 0.1 to 10 parts by weight, especially 0.2 to 5 parts by weight, per 100 parts by weight of antifouling coating composition. Per 100 parts by weight of silyl ester copolymer (A) contained in the antifouling coating composition, it is generally preferred that the vinyl ether (co)polymer be contained in an amount of 0. 3 to 60 parts by weight, especially 0. 6 to 40 parts by weight.

When the content of vinyl ether (co)polymer in the antifouling coating composition falls within these ranges, the cracking resistance, peeling resistance and elution velocity stability of obtained coating film tend to be enhanced.

Moreover, various polymers having a hydrophilic group can be used in place of the vinyl ether (co)polymer or together with the vinyl ether (co)polymer. The polymers having a hydrophilic group can be, for example, various (alkoxy)polyalkylene glycol mono(meth)acrylate (co)polymers such as (methoxy)polyethylene glycol mono(meth)acrylate (co)polymer. The same effect as exerted by the vinyl ether (co)polymer can be realized by the use of these polymers.

(Plasticizer (I))

As the plasticizer, there can be employed plasticizers customarily used in paints, such as orthophosphoric acid esters, chlorinated paraffin, phthalic acid esters and adipic acid esters. These plasticizers can be used individually or in combination.

When these plasticizers are used, they are added to the antifouling coating composition in an amount of, for example, 0.1 to 10% by weight based on the antifouling coating composition.

These plasticizers contribute to enhancement of the cracking resistance of coating film (also referred to as "antifouling coating film" herein) formed from the resultant antifouling coating composition. Among the above plasticizers, chlorinated paraffin and orthophosphoric acid esters, such as tricresyl phosphate (TCP), are preferred.

The chlorinated paraffin may be linear or branched, and may be liquid or solid (powdery) at room temperature. As the chlorinated paraffin, there can be mentioned, for example, "Toyoparax 150" and "Toyoparax A-70" produced by Tosoh Corporation. In the present invention, two or more chlorinated paraffins which are different from each other in, for example, the chlorine content and the number of carbon atoms can be used in appropriate combination.

When the above chlorinated paraffin is used as the plasticizer (I), it is generally preferred that the chlorinated paraffin be contained in an amount of 0.05 to 20 parts by weight, especially 0.1 to 15 parts by weight, per 100 parts by weight of antifouling coating composition. Per 100 parts by weight of silyl ester copolymer (A) (solid contents) contained in the antifouling coating composition, it is preferred that the chlorinated paraffin be contained in an amount of 1 to 50 parts by weight, especially 2 to 40 parts by weight. When the amount of chlorinated paraffin falls within these ranges, the effect of suppressing coating film cracking, coating film strength and damaging (impact) resistance would be enhanced.

When an orthophosphoric ester is used as the plasticizer (I), it is generally preferred that the orthophosphoric ester be contained in an amount of 0.05 to 20 parts by weight, especially 0.1 to 15 parts by weight, per 100 parts by weight of antifouling coating composition.

Per 100 parts by weight of silyl ester copolymer (A) (solid contents) contained in the antifouling coating composition, it is preferred that the orthophosphoric ester be contained in an amount of 1 to 50 parts by weight, especially 2 to 40 parts by weight.

When the orthophosphoric ester is contained as the plasticizer (I), a coating film with resistance to cracking and peeling can be formed. In some cases, the consumption of coating film can be accelerated depending on the combinations and amounts of compounding components.

(Antisagging/antisetting Agent)

The antifouling coating composition maybe loaded with known antisagging/antisetting agents in arbitrary amounts. Examples of suitable antisagging/antisetting agents include salts such as Al, Ca and Zn stearates, lecithinates and alkylsulfonates, polyethylene wax, hydrogenated castor oil wax, polyamide wax, mixtures of these waxes, synthetic particulate silica and oxidized polyethylene wax. Of these, hydrogenated castor oil wax, polyamide wax, synthetic particulate silica and oxidized polyethylene wax are preferred. Further, use can be made of antisagging/antisetting agents commercially available by the trade names, for example, "Disparlon A-603-20X" and "Disparlon 4200-20", which are produced by Kusumoto Chemicals, Ltd.

(Pigment and Solvent)

Various known organic and inorganic pigments (e.g., titanium white, red iron oxide, organic red pigments and talc) can be used as the pigment in the antifouling coating composition. In addition, various colorants such as dyes maybe incorporated in the antifouling coating composition.

The cracking resistance of coating film can be enhanced by the use of pigments with needle, flat and flake forms.

Various solvents customarily used in antifouling paints, such as aliphatic, aromatic (e.g., xylene and toluene), ketone, ester and ether solvents, can be incorporated in the antifouling coating composition. The above solvent used in the preparation of silyl ester copolymer (A) may be included in the solvent contained in the antifouling coating composition of the present invention.

(Various Resins)

As additional various resins, there can be mentioned acrylic resins, such as an acrylic ester (co)polymer, a methacrylic ester (co)polymer and a 2-hydroxyethyl acrylate (co)polymer. Further, the antifouling coating composition of the present invention may be loaded with silyl ester (co) polymers described in, for example, Japanese Patent Laid-open Publication Nos. 4(1992)-264170, 4(1992)-264169, 4(1992)-264168, 2(1990)-196869 and 63(1988)-215780, Published Japanese Translation of PCT Patent Applications from Other States, No. 60(1985)-500452 (Japanese Patent Publication No. 5(1993)-32433) and Japanese Patent Laid-open Publication No. 7(1995)-18216.

(Production of Antifouling Coating Composition)

The antifouling coating composition of the present invention can be produced by appropriately employing known processes. For example, the antifouling coating composition can be obtained by simultaneously or in arbitrary sequence adding, to 100 parts by weight of silyl ester copolymer (A) containing constituent units derived from a polymerizable unsaturated carboxylic acid silyl ester, 0.02 to 1000 parts by weight of carboxylic acid (B), 1.5 to 1200 parts by weight of bivalent or trivalent metal compound (C), 0.01 to 50 parts by weight of dehydrating agent (D), 3 to 1400 parts by weight of antifouling agent (E), 0.1 to 700 parts by weight of zinc oxide (F), 0 to 600 parts by weight of elution accelerating component (G), 0.3 to 200 parts by weight of vinyl ether (co)polymer (H), 1 to 50 parts by weight of plasticizer (I) and appropriate amounts of an antisagging/antisetting agent, a pigment, a solvent, etc., and agitating, mixing and dispersing the composition.

It is preferred to prepare the carboxylic acid excess-metal salt in advance by mixing together a carboxylic acid (B) and a bivalent or trivalent metal compound (C) together with an appropriate amount of solvent. When this advance preparation is effected, the salt formation can be carried on easily and rapidly. Further, when the dehydrating agent (D) is mixed during the preparation of the above excess-metal salt or thereafter, the water generated during the formation of excess-metal salt can be efficiently removed.

The antifouling coating composition of excellent properties according to the present invention can be efficiently prepared by, after the above operation, adding remaining components to be added simultaneously or in arbitrary sequence, and by agitating, mixing and dispersing the composition.

More specifically, in method (1), a carboxylic acid (B) and a bivalent or trivalent metal compound (C), the bivalent or trivalent metal compound (C) used in an amount of 1.2 equivalents or more in terms of the number of equivalents of metal as a constituent of the bivalent or trivalent metal compound (C) per equivalent of carboxyl group of the carboxylic acid (B) as aforementioned, are brought into contact with each other through mixing/stirring or like means to there by form an organic carboxylic acid excess-metal salt in advance.

Thereafter, the obtained component (composition) containing organic carboxylic acid excess-metal salt is mixed with other aforementioned various components to be added, including given amounts of dehydrating agent (D) and component (A), and stirred. In this manner, preferably, there can be obtained the antifouling coating composition containing organic carboxylic acid excess-metal salt according to the present invention.

Alternatively, in method (2), a carboxylic acid (B) and a bivalent or trivalent metal compound (C), the bivalent or trivalent metal compound (C) used in an amount of 1.2 equivalents or more in terms of the number of equivalents of metal as a constituent of the bivalent or trivalent metal compound (C) per equivalent of carboxyl group of the carboxylic acid (B) as aforementioned, together with a given amount of dehydrating agent (D) are brought into contact with each other through mixing/stirring or like means to there by form a component (composition) containing an organic carboxylic acid excess-metal salt, wherein the amount of formed water has been reduced or made nil, in advance.

Thereafter, the obtained component (composition) containing organic carboxylic acid excess-metal salt is mixed with given amounts of aforementioned essential component (A) and various optional components, and stirred. In this manner as well, there can preferably be obtained the antifouling coating composition containing organic carboxylic acid excess-metal salt according to the present invention.

The thus obtained antifouling coating composition is of the one package type and has excellent storage stability. Further, the antifouling coating composition satisfies various requirements for performance such as antifouling paint adherence, durability and antifouling properties.

For example, hulls, marine structures and other shaped items covered with an antifouling coating film having excellent cracking resistance and antifouling properties can be obtained by applying the above antifouling coating composition to the surface of various shaped items (base materials), such as an underwater/floating structure, namely, a marine structure (e.g., plumbing port of a nuclear power station), a sludge diffusion preventive film for use in various ocean civil works for a bayshore road, an undersea tunnel, port facilities, a canal/channel, etc., a marine vessel and a fishing gear (e.g., a rope and a fishing net), once or a plurality of times hardening the applied antifouling coating composition according to the customary procedure. This antifouling coating composition may be directly applied to the surface of hulls and marine structures, or applied to the surface of hulls and marine structures precoated with an undercoating material such as a rust preventive or a primer. Moreover, the antifouling coating composition of the present invention may be applied as a top coat for repair to the surface of hulls and marine structures previously coated with the conventional antifouling paint or the antifouling coating composition of the present invention. Although the thickness of the antifouling coating film thus formed on the surface of hulls and marine structures is not particularly limited, for example, it ranges from about 30 to 150 $\mu$m for each application.

Effect of the Invention

According to the present invention, there can be obtained an antifouling coating composition capable of forming an antifouling coating film which exhibits less cracking tendency, excellent adherence so as to ensure less peeling tendency and desirably controlled hydrolysis rate so as to be excellent in antifouling performance (antifouling activity), in particular, antifouling properties in stationary environment or highly fouling environment and long-term antifouling properties, which antifouling coating composition is excellent in storage stability, can reduce the amount of solvent used therein and is excellent in applicability (uniform thick film can be formed by one coating operation).

Further, according to the present invention, there is provided a coating film with the above excellent properties, and provided a hull or underwater structure covered with the coating film to thereby have the above excellent properties.

Still further, according to the present invention, there is provided an antifouling method wherein the above antifouling coating composition is employed to thereby minimize the danger of environmental pollution.

EXAMPLE

The present invention will further be illustrated below with reference to the following Examples which in no way limit the scope of the invention. In the following Examples and Comparative Examples, the term "parts" means "parts by weight".

Production Example 1

(Production of Silyl (meth)acrylate Copolymer (S-1)

100 parts of xylene was charged in a reaction vessel equipped with a stirrer, a condenser, a thermometer, a dropping device, a nitrogen introduction tube and a heating/cooling jacket, and heated under stirring at 85° C. in a nitrogen stream. A mixture of 50 parts of triisopropylsilyl acrylate, 50 parts of methyl methacrylate and 1 part of 2,2'-azobisisobutyronitrile as a polymerization initiator was dropped through the dropping device into the reaction vessel while maintaining the above temperature over a period of 2 hrs. The stirring was continued at the same temperature for 4 hrs. Further, 0.4 part of 2,2'-azobisisobutyronitrile was added, and the stirring was continued at the same temperature for 4 hrs. Thus, a colorless transparent solution of silyl (meth)acrylate copolymer (S-1) was obtained.

The heating residue (residue after drying in a thermostatic oven set at 105° C. for 3 hrs) from the obtained solution of copolymer (S-1) amounted to 51.2% by weight. The viscosity at 25° C. thereof was 408 cps, and the weight average molecular weight (Mw) and number average molecular weight (Mn), measured by GPC, of the copolymer were 19434 and 6618, respectively.

GPC measurements were performed under the following conditions.

(Conditions for GPC measurement)

Instrument: HLC-8120 GPC manufactured by Tosoh Corporation,

Column: Super H2000+H4000 of 6 mm inside diameter and 15 cm, manufactured by Tosoh Corporation, Eluant: THF (tetrahydrofuran), Flow rate: 0.500 ml/min, Detector: RI, and Temperature of column thermostatic chamber: 40° C.

Production Examples 2 to 17

(Production of Silyl (meth)acrylate Copolymers (S-2) to (S-17))

These copolymers (S-2) to (S-17) were produced in the same manner except that in the preparation of copolymer solution, the dropped copolymerizable monomer formulations were changed as specified in Tables 1 and 2. The properties of these copolymers (solutions) were also measured in the same manner.

The results are collectively listed in Tables 1 and 2.

Comparative Production Examples 1 to 3

(Production of Silyl (meth)acrylate Copolymers (H-1) to (H-3))

These copolymers (H-1) to (H-3) were produced in the same manner except that in the preparation of copolymer solution, the dropped copolymerizable monomer formulations were changed as specified in Tables 1 and 2. The properties of these copolymers (solutions) were also measured in the same manner.

The results are collectively listed in Tables 1 and 2.

TABLE 1

| Type of polymer (loadings: parts by weight) | | S-1 | S-2 | S-3 | S-4 | S-5 | S-6 | S-7 | S-8 | S-9 |
|---|---|---|---|---|---|---|---|---|---|---|
| Solvent | xylene | 100 | 100 | 100 | 100 | 100 | 100 | 100 | 100 | 100 |
| Dropped components | triisopropylsilyl acrylate | 50 | 50 | | 40 | 50 | 50 | 65 | | |
| | tri-n-butylsilyl methacrylate | | | 50 | | | | | | |
| | triisobutylsilyl methacrylate | | | | | | | | 50 | |
| | di-sec-butylmethylsilyl methacrylate | | | | | | | | | 45 |
| | diisopropylmethylsilyl methacrylate | | | | | | | | | |
| | methyl methacrylate | 50 | 45 | 50 | 55 | 45 | 40 | 30 | 45 | 50 |
| | 2-methoxyethyl acrylate | | 5 | | | | | | | |
| | ethyl acrylate | | | | 5 | 5 | 10 | 5 | 5 | 5 |
| | 2-hydroxypropyl acrylate | | | | | | | | | |
| | 2-hydroxybutyl acrylate | | | | | | | | | |
| | polyethylene glycol monomethacrylate (n = 5) | | | | | | | | | |
| | methoxypolyethylene glycol monomethacrylate (n = 45) | | | | | | | | | |
| | N-ethoxymethylacrylamide | | | | | | | | | |
| | 2,2'-azobisisobutyronitrile | 1 | 1 | 1 | 1 | 1 | 1 | 1 | 1 | 1 |
| Properties of product | heating residue (wt. %) | 51.2 | 50.1 | 50.6 | 49.5 | 50.8 | 49.6 | 50.1 | 50.3 | 48.9 |
| | viscosity/25° C. (cps) | 408 | 111 | 279 | 364 | 343 | 297 | 335 | 222 | 365 |
| | GPC measurement   Mn | 6618 | 4449 | 11200 | 4998 | 4596 | 5039 | 5113 | 5004 | 4857 |
| | Mw | 19434 | 15773 | 20500 | 16229 | 16049 | 16987 | 16038 | 17489 | 18254 |
| | Mw/Mn | 2.9 | 3.5 | 1.8 | 3.2 | 3.5 | 3.4 | 3.1 | 3.5 | 3.8 |
| Type of polymer (loadings: parts by weight) | | S-10 | S-11 | S-12 | S-13 | S-14 | S-15 | S-16 | S-17 | |

TABLE 1-continued

| | | | | | | | | | | |
|---|---|---|---|---|---|---|---|---|---|---|
| Solvent | xylene | 100 | 100 | 100 | 100 | 100 | 100 | 100 | 100 |
| Dropped components | triisopropylsilyl acrylate | | 50 | 50 | 50 | 50 | 50 | 30 | 50 |
| | tri-n-butylsilyl methacrylate | | 5 | | | | | | |
| | triisobutylsilyl methacrylate | | | | | | | | |
| | di-sec-butylmethylsilyl methacrylate | | | | | | | | |
| | diisopropylmethylsilyl methacrylate | 45 | | | | | | | |
| | methyl methacrylate | 50 | 45 | 45 | 45 | 45 | 45 | 65 | 45 |
| | 2-methoxyethyl acrylate | | | | | | | | |
| | ethyl acrylate | 5 | | | | | | | |
| | 2-hydroxypropyl acrylate | | | 5 | | | | | |
| | 2-hydroxybutyl acrylate | | | | 5 | | | | |
| | polyethylene glycol monomethacrylate (n = 5) | | | | | 5 | | | |
| | methoxypolyethylene glycol monomethacrylate (n = 45) | | | | | | 5 | | |
| | N-ethoxymethylacrylamide | | | | | | | 5 | 5 |
| | 2,2'-azobisisobutyronitrile | 1 | 1 | 1 | 1 | 1 | 1 | 1 | 1 |
| Properties of product | heating residue (wt. %) | 50.5 | 50.7 | 50.9 | 50.9 | 50.9 | 50.4 | 50.5 | 50.9 |
| | viscosity/25° C. (cps) | 698 | 264 | 353 | 297 | 374 | 304 | 493 | 466 |
| | GPC measurement Mn | 5788 | 5223 | 5132 | 5167 | 5382 | 3514 | 6228 | 5470 |
| | Mw | 18567 | 19196 | 19344 | 17963 | 27009 | 14798 | 21435 | 20894 |
| | Mw/Mn | 3.2 | 3.7 | 3.8 | 3.5 | 5.0 | 4.2 | 3.4 | 3.8 |

TABLE 2

(Comparative Polymers)

| Type of polymer (loadings: parts by weight) | | H-1 | H-2 | H-3 |
|---|---|---|---|---|
| Solvent | xylene | 100 | 100 | 100 |
| Dropped components | triisopropylsilyl acrylate | 50 | 50 | |
| | tri-n-butylsilyl methacrylate | | | 50 |
| | methyl methacrylate | 50 | 45 | 50 |
| | 2-methoxyethyl acrylate | | 5 | |
| | 2,2'-azobisisobutyronitrile | 1 | 1 | 1 |
| Properties of product | heating residue (wt. %) | 51.2 | 50.1 | 50.6 |
| | viscosity/25° C. (cps) | 408 | 111 | 279 |
| | GPC measurement Mn | 6618 | 4449 | 11200 |
| | Mw | 19434 | 15773 | 20500 |
| | Mw/Mn | 2.9 | 3.5 | 1.8 |

IR measurements were performed under the following conditions.

(Conditions for IR Measurement)

Instrument: Hitachi infrared spectrophotometer, model 270-30, manufactured by Hitachi, Ltd., and Measuring method: KBr cell, coating method.

The zinc content measured by chelatometric titration was 15.40%. The chelatometric titration was performed in the following manner.

(Chelatometric Titration)

A sample was dissolved in toluene. EDTA was added to the solution, thereby forming a metal chelate. Back titration of excess EDTA was performed with a solution of zinc chloride by the use of BT as an indicator, thereby determining a metal content.

BT: Eriochrome Black T (sodium 1-(hydroxy-2-naphtholazo)-6-nitro-2-naphthol-4-sulfate)

Example 1

(Preparation of Antifouling Coating Composition)

2.3 parts by weight of isononanoic acid, 6 parts by weight of zinc oxide and 3 parts by weight of xylene were charged into the container of a paint shaker. An appropriate amount of glass beads were added to the mixture, and shaken for 30 min by the paint shaker (preliminary dispersion).

Thereafter, 20 parts by weight of copolymer solution (S-1), 44 parts by weight of cuprous oxide, 3 parts by weight of 2-pyridinethiol-1-oxide copper salt, 2 parts by weight of titanium white, 2 parts by weight of anhydrous gypsum D-1, 1.5 parts by weight of Disparlon 4200-20, 4 parts by weight of Disparlon A-603-20X and 9.7 parts by weight of xylene (the amount of solvent was regulated so that the initial Ku value became 85±5) were added to the mixture, and all the components were shaken together for 2 hrs (main dispersion).

The resultant dispersion was filtered through a 100-mesh filter, thereby obtaining a desired antifouling coating composition.

With respect to the antifouling coating composition, the initial Ku value was 90, and the storage stability and stationary antifouling performance were both graded as 5. Further, the coating film consumption was 12 μm/2 months, and the coating film condition was graded as 5.

The results are collectively listed in Tables 3 to 7.

Initial Ku

The viscosity (Ku value/25° C.) of antifouling coating composition immediately after preparation was measured by a Stormer viscometer.

Storage Stability

The storage stability of antifouling coating composition measured after storing at room temperature for 2 months is collectively listed in Tables 3 to 7.

Evaluation of storage stability was made on the basis of an increment of viscosity (Ku value at 25° C. measured by a Stormer viscometer) exhibited after storage at room temperature for two months after the paint preparation over the viscosity immediately after the paint preparation.

(Criterion for Evaluation)

5: viscosity increment is less than 10,
4: viscosity increment is in the range of 10 to less than 20,
3: viscosity increment is in the range of 20 to less than 30,
2: viscosity increment is 30 or greater, and
1: there is no fluidity, and measuring of Ku value is impossible.

Furthermore, with respect to the antifouling coating composition, the stationary antifouling performance and consumption rate were evaluated in the following manner.

The results are collectively listed in Tables 3 to 7.
Testing of Stationary Antifouling Performance An epoxy-based zinc-rich primer (content of zinc powder in paint film: 80% by weight), a tar epoxy-based anti corrosive paint and a vinyl binder coat were successively applied in this order to a sandblasted steel plate of 100×300×2 mm at one-day intervals so that the respective film thicknesses were 20, 150 and 75 μm, respectively, in the dry state. Thereafter, the antifouling coating composition to be tested was applied to the coated steel plate so that its thickness was 100 μm in the dry state, thereby obtaining a specimen plate.

This specimen plate was suspended from a test raft set off the bay of Nagasaki so that it positioned at an underwater depth of 1 m. The area of adherence of macroorganisms (barnacle, serpula, etc.) to the specimen plate was evaluated 24 months later.

Criterion for Evaluation (mark)
5: no adherence,
4: adherence of less than 5%,
3: adherence of 5% to less than 15%,
2: adherence of 15% to less than 40%, and
1: adherence of 40% or more.

Evaluation of Consumption Rate and Coating Film Condition (Evaluation of Consumption Rate)

An epoxy-based zinc-rich primer, an epoxy-based anti-corrosive paint and a vinyl binder coat were successively applied in this order at one-day intervals to a disk-shaped sandblasted plate of 300 mm diameter and 3 mm thickness so that the respective film thicknesses were 20, 150 and 50 μm, respectively, in the dry state. The obtained coated plate was dried indoors for 7 days. Thereafter, the antifouling coating composition to be tested was radially applied onto the coated plate in the radius direction from the center thereof by the use of an applicator with a clearance of 500 μm, thereby obtaining a specimen plate. This specimen plate was secured to a motor and rotated in a thermostatic bath filled with 25° C. seawater at a peripheral speed of 15 knots for 2 months. The consumption rate (decrease of coating film thickness) in the vicinity of the circumference of specimen plate was measured.

Furthermore, the condition of coating film at the time of measuring the decrease of coating film thickness was evaluated by visual inspection according to the following criterion.

(Criterion for Evaluation)
5: no abnormality is observed on the coating film,
4: some tiny cracks are observed,
3: tiny cracks are observed overall,
2: some clear cracks are observed, and
1: clear cracks are observed overall.

Component nomenclatures employed in Tables 3 to 7 are as follows:
(1) "Toyoparax 150"
  chlorinated paraffin produced by Tosoh Corporation, having 14.5 carbon atoms on the average, a chlorine content of 50%, a viscosity of 12 ps at 25° C. and a specific gravity of 1.25 at 25° C.;
(2) "Lutonal A-25"
  polyvinyl ethyl ether produced by BASF AG, having a viscosity of 2.5 to 6.0 Pa·s at 23° C. and a specific gravity of 0.96 at 20° C.;
(3) "Rosin Solution"
  50% solution of WW rosin in xylene;
(4) "Copper Naphthenate Solution"
  solution of copper naphthenate in xylene, having a copper content in solution of 8%;
(5) "Soluble Anhydrous Gypsum D-1"
  IIICaSO$_4$ white powder of 15 μm average particle diameter, produced by Noritake Co., Ltd.;
(6) "Disparlon 4200-20"
  oxidized polyethylene wax (20% xylene paste), produced by Kusumoto Chemicals, Ltd.; and
(7) "Disparlon A603-20X"
  fatty acid amide wax (20% xylene paste), produced by Kusumoto Chemicals, Ltd.

Examples 2 to 38 and Comparative Examples 1 to 10

(Preparation of Antifouling Coating Compositions)

Antifouling coating compositions were prepared in the same manner as in Example 1, except that the formulations thereof were changed as specified in Tables 3 to 7.

With respect to the obtained antifouling coating compositions, not only the storage stability thereof but also the stationary antifouling performance and consumption rate of antifouling coating films formed from the antifouling coating compositions were evaluated.

The results are collectively listed in Tables 3 to 7.

TABLE 3

| Formulation (loadings: parts by weight) | | | Example | | | | | | | | | | | |
|---|---|---|---|---|---|---|---|---|---|---|---|---|---|---|
| | | | 1 | 2 | 3 | 4 | 5 | 6 | 7 | 8 | 9 | 10 | 11 | 12 |
| Prelim. dispersion components | isononanoic acid | | 2.3 | 5.0 | 2.3 | 5.0 | 2.3 | 5.0 | 1.6 | 3.2 | 5.0 | 5.0 | 5.0 | |
| | versatic acid | | | | | | | | | | | | | 1.6 |
| | rosin | | | | | | | | | | | | | |
| | zinc oxide | | 6.0 | 7.7 | 6.0 | 7.7 | 6.0 | 7.7 | 1.0 | 2.0 | 3.0 | 7.7 | 7.7 | 6.5 |
| | xylene | | 3.0 | 6.0 | 3.0 | 6.0 | 3.0 | 6.0 | 3.0 | 4.0 | 6.0 | 6.0 | 6.0 | 2.0 |
| | anhydrous gypsum D-1 | | | 3.0 | 2.0 | 3.0 | 2.0 | 3.0 | 1.0 | 2.0 | 3.0 | 1.0 | 1.0 | 1.0 |
| Main dispersion components | | | | | | | | | | | | | | |
| type of copolymer soln. (see Tables 1–2) | | | S-1 | S-1 | S-2 | S-2 | S-3 | S-4 | S-5 | S-5 | S-5 | S-5 | S-5 | S-5 |
| amt. of copolymer soln. added | | | 20.0 | 13.0 | 20.0 | 13.0 | 20.0 | 13.0 | 20.0 | 20.0 | 13.0 | 13.0 | 13.0 | 20.0 |
| Toyoparax 150 | | | | | | | 4.0 | | | | | | 1.0 | |
| Lutonal A-25 | | | | | | | | | | | | | | 2.0 |
| antifouling agent | cuprous oxide | | 44.0 | 44.0 | 44.0 | 44.0 | 41.0 | 44.0 | 44.0 | 44.0 | 44.0 | 44.0 | 44.0 | 44.0 |
| | 2-pyridinethiol-1-oxide Cu salt | | 3.0 | 3.0 | 3.0 | 3.0 | 3.0 | 3.0 | 3.0 | 3.0 | 3.0 | 3.0 | 3.0 | 3.0 |
| | 2-pyridinethiol-1-oxide | | | | | | | | | | | | | |

TABLE 3-continued

| Formulation (loadings: parts by weight) | | Example | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| | Zn salt | | | | | | | | | | | | |
| | 4,5-dichloro-2-n-octyl-isothiazolin-3-one | | | | | | | | | | | | |
| | 2,4,5,6-tetrachloroiso-phthalonitrile | | | | | | | | | | | | |
| | 2-methylthio-4-t-butyl-amino-6-cyclopropyl-amino-s-triazine | | | | | | | | | | | | |
| | N-(2,4,6-trichlorophenyl)maleimide | | | | | | | | | | | | |
| | N,N-dimethyldichloro-phenylurea | | | | | | | | | | | | |
| | pyridine-triphenylborane | | | | | | | | | | | | |
| | copper rhodanate | | | | | | | | | | | | |
| titanium white | | 2.0 | 2.0 | 2.0 | 2.0 | 2.0 | 2.0 | 2.0 | 2.0 | 2.0 | 2.0 | 2.0 | 2.0 |
| anhydrous gypsum D-1 | | 2.0 | | | | | | | | | 2.0 | 2.0 | 0.5 |
| zinc oxide | | | | | | | | 5.5 | 5.1 | 4.7 | | | |
| talc F2 | | | | | | | | | | | | | |
| Disparlon 4200-20 | | 1.5 | 1.5 | 1.5 | 1.5 | 1.5 | 1.5 | 1.5 | 1.5 | 1.5 | 1.5 | 1.5 | 1.5 |
| Disparlon A603-20X | | 4.0 | 4.0 | 4.0 | 4.0 | 4.0 | 4.0 | 4.0 | 4.0 | 4.0 | 4.0 | 4.0 | 4.0 |
| xylene | | 9.7 | 7.8 | 9.7 | 7.8 | 8.2 | 6.8 | 9.4 | 8.2 | 6.8 | 6.7 | 7.8 | 9.9 |
| total | | 97.5 | 97.0 | 97.5 | 97.0 | 97.0 | 96.0 | 96.0 | 99.0 | 96.0 | 96.9 | 99.0 | 96.0 |
| Evaluation result | initial Ku | 90 | 87 | 85 | 82 | 88 | 84 | 90 | 86 | 81 | 85 | 86 | 86 |
| | storage stability | 5 | 5 | 5 | 5 | 5 | 5 | 5 | 5 | 5 | 5 | 5 | 5 |
| | stationary antifouling performance | 5 | 5 | 5 | 5 | 5 | 5 | 5 | 5 | 5 | 5 | 5 | 4 |
| | consumption ($\mu$/2 month-s) | 12 | 22 | 17 | 44 | 40 | 32 | 12 | 17 | 40 | 15 | 22 | 6 |
| | condition of coating film | 5 | 5 | 5 | 5 | 4 | 5 | 5 | 5 | 5 | 5 | 5 | 5 |

TABLE 4

| Formulation (loadings: parts by weight) | | Example | | | | | | | | | | | |
|---|---|---|---|---|---|---|---|---|---|---|---|---|---|
| | | 13 | 14 | 15 | 16 | 17 | 18 | 19 | 20 | 21 | 22 | 23 | 24 |
| Prelim. dispersion components | isononanoic acid | | | | | | | 5.0 | 5.0 | 5.0 | 5.0 | 5.0 | 5.0 |
| | versatic acid | 3.2 | 5.1 | 5.1 | 5.1 | 5.2 | | | | | | | |
| | rosin | | | | | | 4.2 | | | | | | |
| | zinc oxide | 6.0 | 7.6 | 7.6 | 8.6 | 7.5 | 6.7 | 7.7 | 7.7 | 7.7 | 7.7 | 7.7 | 7.7 |
| | xylene | 4.0 | 6.0 | 6.0 | 6.0 | 6.0 | 4.6 | 6.0 | 6.0 | 6.0 | 6.0 | 6.0 | 6.0 |
| | anhydrous gypsum D-1 | 1.0 | 1.0 | 1.0 | 1.0 | 1.0 | 1.0 | 1.0 | 1.0 | 1.0 | 1.0 | 1.0 | 1.0 |
| Main dispersion components | | | | | | | | | | | | | |
| type of copolymer soln. (see Tables 1–2) | | S-5 | S-5 | S-5 | S-7 | S-5 | S-5 | S-6 | S-7 | S-8 | S-9 | S-10 | S-11 |
| amt. of copolymer soln. added | | 20.0 | 13.0 | 13.0 | 13.0 | 13.0 | 13.0 | 13.0 | 13.0 | 13.0 | 13.0 | 13.0 | 13.0 |
| Toyoparax 150 | | | | | | .0 | | | | | 4.0 | 4.0 | |
| Lutonal A-25 | | | | 2.0 | | | | | | | | | |
| Antifouling agent | cuprous oxide | 44.0 | 44.0 | 44.0 | 44.0 | 44.0 | 44.0 | 44.0 | 44.0 | 44.0 | 44.0 | 44.0 | 44.0 |
| | 2-pyridinethiol-1-oxide Cu salt | 3.0 | 3.0 | 3.0 | 3.0 | 3.0 | 3.0 | 3.0 | 3.0 | 3.0 | 3.0 | 3.0 | 3.0 |
| | 2-pyridinethiol-1-oxide Zn salt | | | | | | | | | | | | |
| | 4,5-dichloro-2-n-octyl-isothiazolin-3-one | | | | | | | | | | | | |
| | 2,4,5,6-tetrachloroiso-phthalonitrile | | | | | | | | | | | | |
| | 2-methylthio-4-t-butyl-amino-6-cyclopropyl-amino-s-triazine | | | | | | | | | | | | |
| | N-(2,4,6-trichlorophenyl)maleimide | | | | | | | | | | | | |
| | N,N-dimethyldichloro-phenylurea | | | | | | | | | | | | |
| | pyridine-triphenylborane | | | | | | | | | | | | |
| | copper rhodanate | | | | | | | | | | | | |
| titanium white | | 2.0 | 2.0 | 2.0 | 2.0 | 2.0 | 2.0 | 2.0 | 2.0 | 2.0 | 2.0 | 2.0 | 2.0 |
| anhydrous gypsum D-1 | | 0.5 | 0.5 | 0.5 | 0.5 | 0.5 | 0.5 | 0.5 | 0.5 | 0.5 | 0.5 | 0.5 | 0.5 |
| zinc oxide | | | | | | | | | | | | | |
| talc F2 | | | | | | | | | | | | | |
| Disparlon 4200-20 | | 1.5 | 1.5 | 1.5 | 1.5 | 1.5 | 1.5 | 1.5 | 1.5 | 1.5 | 1.5 | 1.5 | 1.5 |
| Disparlon A603-20X | | 4.0 | 4.0 | 4.0 | 4.0 | 4.0 | 4.0 | 4.0 | 4.0 | 4.0 | 4.0 | 4.0 | 4.0 |

TABLE 4-continued

| Formulation (loadings: parts by weight) | | Example | | | | | | | | | | | |
|---|---|---|---|---|---|---|---|---|---|---|---|---|---|
| | | 13 | 14 | 15 | 16 | 17 | 18 | 19 | 20 | 21 | 22 | 23 | 24 |
| xylene | | 7.8 | 9.5 | 7.8 | 6.3 | 6.3 | 10.6 | 7.3 | 7.3 | 7.3 | 7.8 | 7.8 | 7.8 |
| total | | 97.0 | 97.2 | 97.5 | 95.0 | 94.0 | 95.1 | 95.0 | 95.0 | 95.0 | 99.5 | 99.5 | 95.5 |
| Evaluation result | initial Ku | 87 | 82 | 82 | 83 | 82 | 82 | 81 | 83 | 80 | 82 | 84 | 83 |
| | storage stability | 5 | 5 | 5 | 5 | 5 | 5 | 5 | 5 | 5 | 4 | 4 | 5 |
| | stationary antifouling performance | 5 | 5 | 5 | 5 | 5 | 5 | 5 | 5 | 5 | 5 | 5 | 5 |
| | consumption ($\mu$/2 months) | 11 | 20 | 17 | 26 | 21 | 36 | 43 | 54 | 39 | 46 | 44 | 39 |
| | condition of coating film | 5 | 5 | 5 | 5 | 5 | 5 | 5 | 5 | 5 | 5 | 5 | 5 |

TABLE 5

| Formulation (loadings: parts by weight) | | Example | | | | | | | | | | | |
|---|---|---|---|---|---|---|---|---|---|---|---|---|---|
| | | 25 | 26 | 27 | 28 | 29 | 30 | 31 | 32 | 33 | 34 | 35 | 36 |
| Prelim. dispersion components | isononanoic acid | 5.0 | 5.0 | 5.0 | 5.0 | 5.0 | 5.0 | 5.0 | 5.0 | 5.0 | 5.0 | 5.0 | 5.0 |
| | versatic acid | | | | | | | | | | | | |
| | rosin | | | | | | | | | | | | |
| | zinc oxide | 7.7 | 7.7 | 7.7 | 7.7 | 7.7 | 7.7 | 7.7 | 7.7 | 7.7 | 7.7 | 7.7 | 7.7 |
| | xylene | 6.0 | 6.0 | 6.0 | 6.0 | 6.0 | 6.0 | 6.0 | 6.0 | 6.0 | 6.0 | 6.0 | 6.0 |
| | anhydrous gypsum D-1 | 1.0 | 1.0 | 1.0 | 1.0 | 1.0 | 1.0 | 2.0 | 2.0 | 2.0 | 2.0 | 2.0 | 2.0 |
| Main dispersion components | | | | | | | | | | | | | |
| type of copolymer soln. (see Tables 1–2) | | S-12 | S-13 | S-14 | S-15 | S-16 | S-17 | S-5 | S-5 | S-5 | S-5 | S-5 | S-5 |
| amt. of copolymer soln. added | | 13.0 | 13.0 | 13.0 | 13.0 | 13.0 | 13.0 | 13.0 | 13.0 | 13.0 | 13.0 | 13.0 | 13.0 |
| Toyoparax 150 | | | | | | | | | | | | | |
| Lutonal A-25 | | | | | | | | | | | | | |
| antifouling agent | cuprous oxide | 44.0 | 44.0 | 44.0 | 44.0 | 44.0 | 44.0 | 44.0 | 44.0 | 44.0 | 44.0 | 44.0 | 44.0 |
| | 2-pyridinethiol-1-oxide Cu salt | 3.0 | 3.0 | 3.0 | 3.0 | 3.0 | 3.0 | | 3.0 | | 2.0 | 2.0 | 2.0 |
| | 2-pyridinethiol-1-oxide Zn salt | | | | | | | 1.0 | | | | | |
| | 4,5-dichloro-2-n-octyl-isothiazolin-3-one | | | | | | | 4.0 | 3.0 | | | | |
| | 2,4,5,6-tetrachloroiso-phthalonitrile | | | | | | | | | 6.0 | | | |
| | 2-methylthio-4-t-butyl-amino-6-cyclopropyl-amino-s-triazine | | | | | | | | | | 3.0 | | |
| | N-(2,4,6-trichlorophenyl)maleimide | | | | | | | | | | | 3.0 | |
| | N,N-dimethyldichloro-phenylurea | | | | | | | | | | | | 3.0 |
| | pyridine-triphenylborane | | | | | | | | | | | | |
| | copper rhodanate | | | | | | | | | | | | |
| titanium white | | 2.0 | 2.0 | 2.0 | 2.0 | 2.0 | 2.0 | 2.0 | 2.0 | 2.0 | 2.0 | 2.0 | 2.0 |
| anhydrous gypsum D-1 | | 0.5 | 0.5 | 0.5 | 0.5 | 0.5 | 0.5 | | | | | | |
| zinc oxide | | | | | | | | | | | | | |
| talc F2 | | | | | | | | | | | | | |
| Disparlon 4200-20 | | 1.5 | 1.5 | 1.5 | 1.5 | 1.5 | 1.5 | 1.5 | 1.5 | 1.5 | 1.5 | 1.5 | 1.5 |
| Disparlon A603-20X | | 4.0 | 4.0 | 4.0 | 4.0 | 4.0 | 4.0 | 4.0 | 4.0 | 4.0 | 4.0 | 4.0 | 4.0 |
| xylene | | 7.3 | 7.3 | 7.3 | 7.3 | 7.3 | 7.3 | 7.3 | 8.3 | 8.8 | 8.3 | 8.3 | 8.3 |
| total | | 95.0 | 95.0 | 95.0 | 95.0 | 95.0 | 95.0 | 97.5 | 99.5 | 100.0 | 98.5 | 98.5 | 98.5 |
| Evaluation result | initial Ku | 82 | 82 | 84 | 84 | 84 | 85 | 82 | 83 | 85 | 85 | 86 | 85 |
| | storage stability | 5 | 5 | 5 | 5 | 5 | 5 | 5 | 5 | 5 | 5 | 5 | 5 |

TABLE 5-continued

| Formulation (loadings: parts by weight) | Example | | | | | | | | | | | |
|---|---|---|---|---|---|---|---|---|---|---|---|---|
| | 25 | 26 | 27 | 28 | 29 | 30 | 31 | 32 | 33 | 34 | 35 | 36 |
| stationary antifouling performance | 5 | 5 | 5 | 5 | 5 | 5 | 5 | 5 | 5 | 5 | 5 | 5 |
| consumption (μ/2 month-s) | 49 | 45 | 50 | 45 | 39 | 55 | 43 | 43 | 44 | 45 | 45 | 42 |
| condition of coating film | 5 | 5 | 5 | 5 | 5 | 5 | 5 | 5 | 5 | 5 | 5 | 5 |

TABLE 6

| Formulation (loadings: parts by weight) | | | Example | |
|---|---|---|---|---|
| | | | 37 | 38 |
| Prelim. dispersion components | isononanoic acid | | 5.0 | 5.0 |
| | versatic acid | | | |
| | rosin | | | |
| | zinc oxide | | 7.7 | 7.7 |
| | xylene | | 6.0 | 6.0 |
| | anhydrous gypsum D-1 | | 2.0 | 2.0 |
| Main dispersion components | | | | |
| type of copolymer soln. (see Tables 1–2) | | | S-5 | S-5 |
| amt. of copolymer soln. added | | | 30.0 | 30.0 |
| Toyoparax 150 | | | | |
| Lutonal A-25 | | | | |
| antifouling agent | cuprous oxide | | | |
| | 2-pyridinethiol-1-oxide Cu salt | | | |
| | 2-pyridinethiol-1-oxide Zn salt | | | |
| | 4,5-dichloro-2-n-octylisothiazolin-3-one | | | |
| | 2,4,5,6-tetrachloroisophthalo-nitrile | | | |
| | 2-methylthio-4-t-butylamino-6-cyclopropylamino-s-triazine | | | |
| | N-(2,4,6-trichlorophenyl)maleimide | | | |
| | N,N-dimethyldichlorophenylurea | | | |
| | pyridine-triphenylborane | | 9.0 | |
| | copper rhodanate | | | 10.0 |
| titanium white | | | 2.0 | 2.0 |
| anhydrous gypsum D-1 | | | | |
| zinc oxide | | | 13.0 | 13.0 |
| talc F2 | | | 7.0 | 7.0 |
| Disparlon 4200-20 | | | 1.5 | 1.5 |
| Disparlon A603-20X | | | 4.0 | 4.0 |
| Xylene | | | 9.8 | 9.3 |
| total | | | 97.0 | 97.5 |
| Evaluation result | initial Ku | | 87 | 88 |
| | storage stability | | 5 | 5 |
| | stationary antifouling performance | | 5 | 5 |
| | consumption (μ/2 months) | | 31 | 28 |
| | condition of coating film | | 5 | 5 |

TABLE 7

| Formulation (loadings: parts by weight) | Comparative Example | | | | | | | | | |
|---|---|---|---|---|---|---|---|---|---|---|
| | 1 | 2 | 3 | 4 | 5 | 6 | 7 | 8 | 9 | 10 |
| copolymer soln. S-1 | 26 | | | | | | | | | |
| S-2 | | 26 | 20 | 13 | 20 | 13 | | | | |
| S-3 | | | | | | | 20 | 20 | 20 | 20 |
| isononanoic acid | | | 3 | 6.5 | | | 3 | | | |
| K-3 (1:1 equiv. ratio) | | | | | 4.3 | 9.5 | | 4.3 | | |
| versatic acid | | | | | | | | | 3 | |
| rosin (WW rosin) | | | | | | | | | | 3 |
| Toyoparax 150 | | | | | | | 4 | 4 | 4 | 4 |
| titanium white | 2 | 2 | 2 | 2 | 2 | 2 | 2 | 2 | 2 | 2 |
| cuprous oxide | 45 | 45 | 45 | 45 | 45 | 45 | 42 | 42 | 42 | 42 |
| zinc oxide | 6 | 6 | 6 | 6 | 6 | 6 | 6 | 6 | 6 | 6 |
| copper pyrithione | 3 | 3 | 3 | 3 | 3 | 3 | 3 | 3 | 3 | 3 |
| anhydrous gypsum D-1 | 1 | 1 | 1 | 1 | 1 | 1 | 1 | 1 | 1 | 1 |
| Disparlon 4200-20 | 1.5 | 1.5 | 1.5 | 1.5 | 1.5 | 1.5 | 1.5 | 1.5 | 1.5 | 1.5 |
| Disparlon A603-20X | 4 | 4 | 4 | 4 | 4 | 4 | 4 | 4 | 4 | 4 |
| xylene | 11.5 | 11.5 | 14.5 | 18 | 13.2 | 15 | 13.5 | 12.2 | 13.5 | 13.5 |
| total | 100 | 100 | 100 | 100 | 100 | 100 | 100 | 100 | 100 | 100 |
| Evaluation result initial Ku | 86 | 86 | 92 | 94 | 92 | 94 | 96 | 95 | 96 | 92 |
| storage stability | 5 | 5 | 3 | 1 | 3 | 1 | 1 | 1 | 1 | 1 |
| stationary antifouling performance | 1 | 1 | 1 | 2 | 1 | 2 | 3 | 3 | 3 | 3 |
| consumption (μ/2 mo-nths) | 4 | 5 | 13 | 24 | 14 | 25 | 39 | 40 | 29 | 34 |
| condition of coating film | 5 | 5 | 3 | 1 | 3 | 1 | 1 | 1 | 1 | 1 |

As apparent from Tables 3 to 7, it was recognized that the use of carboxylic acid (B) in combination with the bivalent or trivalent metal compound (C) reduced the consumption rate of coating film.

What is claimed is:

1. An antifouling coating composition comprising:
   (A) a silyl ester copolymer containing constituent units derived from a polymerizable unsaturated carboxylic acid silyl ester,
   (B) a carboxylic acid,
   (C) a bivalent or trivalent metal compound, and
   (D) a dehydrating agent.
   wherein the bivalent or trivalent metal compound (C) is contained in an amount of 1.2 equivalents or more, in terms of the number of equivalents of metal as a constituent of the bivalent or trivalent metal compound (C), per equivalent of carboxyl group of the carboxylic acid (B).

2. The antifouling coating composition as claimed in claim 1, wherein the bivalent or trivalent metal compound (C) is a bivalent metal compound.

3. The antifouling coating composition as claimed in claim 2, wherein the bivalent or trivalent metal compound (C) is a compound of at least one metal selected from the group consisting of zinc, copper, magnesium, calcium and barium.

4. The antifouling coating composition as claimed in claim 1, wherein the carboxylic acid (B) is a resin acid or resin acid derivative containing at least one carboxylic acid selected from the group consisting of abietic acid, dehydroabietic acid, dihydroabietic acid, tetrahydroabietic acid, noragathic acid, agathenedicarboxylic acid, an agathenedicarboxylic acid monoalkyl ester, secodehydroabietic acid and isomers thereof.

5. The antifouling coating composition as claimed in claim 1, wherein the carboxylic acid (B) is at least one organic acid selected from the group consisting of isononanoic acid, versatic acid, naphthenic acid, oleic acid, linoleic acid, linolenic acid, tall oil fatty acid and soybean oil fatty acid.

6. The antifouling coating composition as claimed in claim 1, wherein the dehydrating agent (D) is an inorganic dehydrating agent.

7. The antifouling coating composition as claimed in claim 1, wherein the dehydrating agent (D) is contained in an amount of 0.15 to 50 equivalents per equivalent of carboxyl group of the carboxylic acid (B).

8. The antifouling coating composition as claimed in claim 1, wherein the constituent units (a) derived from a polymerizable unsaturated carboxylic acid silyl ester include constituent units derived from a silyl (meth)acrylate which are represented by the formula:

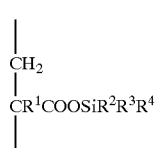

(I)

wherein $R^1$ represents hydrogen or a methyl group; and $R^2$, $R^3$, and $R^4$ may be identical with or different from each other, and each thereof represents any of a hydrogen atom, an alkyl group, a cycloalkyl group, a substituted or unsubstituted phenyl group and an alkylsilyloxy group.

9. The antifouling coating composition as claimed in claim 8, wherein in the formula (I), $R^2$ represents a branched alkyl group or a cycloalkyl group.

10. The antifouling coating composition as claimed in claim 1, wherein the silyl ester copolymer (A) contains constituent units (a) derived from a polymerizable unsaturated carboxylic acid silyl ester and constituent units (b) derived from a (meth)acrylate having a polar group.

11. The antifouling coating composition as claimed in claim 10, wherein the constituent units (b) derived from a (meth)acrylate having a polar group are constituent units represented by the formula:

(II)

wherein $R^5$ represents a hydrogen atom or a methyl group; and Z represents an oxygen atom or a group of the formula $-NR^7$, provided that:

when Z is an oxygen atom, $R^6$ represents a substituted or unsubstituted hydroxyalkyl group, hydroxycycloalkyl group, polyalkylene glycol group of the formula $-(R^8O)nH$ (wherein $R^8$ represents an alkylene group, and n is an integer of 2 to 50) or alkoxypolyalkylene glycol group of the formula $-(R^xO)nR^y$ (wherein $R^x$ represents an alkylene group, $R^y$ represents an alkyl group, and n is an integer of 1 to 100), and when Z is a group of the formula $-NR^7$, $R^7$ represents an alkyl group unsubstituted or substituted with any of a halogen, a hydroxyl group, an amino group, a substituted amino group, an acyl group and an alkoxy group, and $R^6$ represents a hydrogen atom.

12. The antifouling coating composition as claimed in claim 1, wherein the silyl ester copolymer (A) is a copolymer containing:

silyl (meth)acrylate constituent units (a-1) represented by the formula:

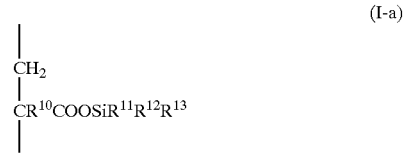

(I-a)

wherein $R^{10}$ represents a hydrogen atom or a methyl group; each of $R^{11}$ and $R^{12}$ independently represents a linear alkyl group having 1 to 10 carbon atoms, or a substituted or unsubstituted phenyl group or trimethylsilyloxy group; and $R^{13}$ represents a cyclic or acyclic, branched or unbranched alkyl group having 1 to 18 carbon atoms, or a substituted or unsubstituted phenyl group having 6 to 10 carbon atoms or trimethylsilyloxy group, and silyl (meth)acrylate constituent units (a-2) represented by the formula:

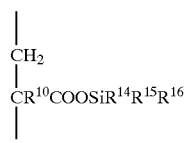

(I-b)

wherein $R^{10}$ represents a hydrogen atom or a methyl group; each of $R^{14}$ and $R^{15}$ independently represents a branched alkyl or cycloalkyl group having 3 to 10 carbon atoms; and $R^{16}$ represents a linear alkyl group having 1 to 10 carbon atoms, a branched alkyl or cycloalkyl group having 3 to 10 carbon atoms, or a substituted or unsubstituted phenyl group having 6 to 10 carbon atoms or trimethylsilyloxy group.

13. The antifouling coating composition as claimed in claim 1, further comprising an antifouling agent (E).

14. The antifouling coating composition as claimed in claim 13, wherein copper or a copper compound (E1) is contained as the antifouling agent (E).

15. The antifouling coating composition as claimed in claim 13, wherein an organic antifouling agent compound (E2) excluding an organocopper compound is contained as the antifouling agent (E).

16. The antifouling coating composition as claimed in claim 1, further comprising zinc oxide (F) as a body pigment or color pigment, said zinc oxide (F) contained in an excess amount up to 5000 equivalents per equivalent of carboxyl group of the carboxylic acid (B).

17. The antifouling coating composition as claimed in claim 1, further comprising an elution accelerating component (G).

18. An antifouling coating film formed from the antifouling coating composition as claimed in claim 1.

19. A marine vessel, an underwater structure, a fishing gear or a fishing net, having a surface covered with the antifouling coating film formed from the antifouling coating composition claimed in claim 1.

20. A method of rendering antifouling a marine vessel, an underwater structure, a fishing gear or a fishing net, which comprises applying the antifouling coating composition claimed in claim 1 to a surface of base material of a marine vessel, an underwater structure, a fishing gear or a fishing net and drying the applied antifouling coating composition so that a formed antifouling coating film covers the base material surface.

21. The antifouling coating composition as claimed in claim 1, wherein the bivalent or trivalent metal compound (C) is a compound of at least one metal compound.

22. The antifouling coating composition as claimed in claim 21, wherein the bivalent or trivalent metal compound (C) is a compound of at least one metal selected from the group consisting of zinc, copper, magnesium, calcium and barium.

* * * * *